United States Patent
Zur

(10) Patent No.: US 6,326,625 B1
(45) Date of Patent: Dec. 4, 2001

(54) X-RAY IMAGING SYSTEM

(75) Inventor: Albert Zur, Ganei Tikva (IL)

(73) Assignee: Edge Medical Devices Ltd., Raanana (IL)

( * ) Notice: Subject to any disclaimer, the term of this patent is extended or adjusted under 35 U.S.C. 154(b) by 0 days.

(21) Appl. No.: 09/292,316

(22) Filed: Apr. 15, 1999

Related U.S. Application Data

(63) Continuation-in-part of application No. 09/233,320, filed on Jan. 20, 1999, and a continuation-in-part of application No. 09/233,327, filed on Jan. 20, 1999.

(51) Int. Cl.$^7$ ........................................................ G01T 1/24
(52) U.S. Cl. ............................. 250/370.09; 250/370.08; 250/580
(58) Field of Search ........................ 250/370.09, 370.08, 250/580

(56) References Cited

U.S. PATENT DOCUMENTS

| | | |
|---|---|---|
| 4,079,255 | 3/1978 | Brueckner et al. . |
| 4,176,275 | 11/1979 | Korn et al. . |
| 4,539,591 | 9/1985 | Zermeno et al. . |
| 4,961,209 | 10/1990 | Rowlands et al. . |
| 4,975,935 | 12/1990 | Hillen et al. . |
| 4,998,266 | 3/1991 | Hillen et al. . |
| 5,023,455 | 6/1991 | Vanstraelen . |
| 5,059,794 | 10/1991 | Takahashi et al. . |
| 5,077,765 | 12/1991 | Hillen et al. . |
| 5,093,851 | 3/1992 | Schafer . |
| 5,097,493 | 3/1992 | Hillen et al. . |
| 5,117,114 | 5/1992 | Street et al. . |
| 5,153,423 | 10/1992 | Conrads et al. . |
| 5,164,809 | 11/1992 | Street et al. . |
| 5,184,018 | 2/1993 | Conrads et al. . |
| 5,196,702 | 3/1993 | Tsuji et al. . |
| 5,230,927 | 7/1993 | Nishizawa et al. . |
| 5,268,569 | 12/1993 | Nelson et al. . |
| 5,280,512 | 1/1994 | Maack et al. . |
| 5,332,893 | 7/1994 | Potts et al. . |
| 5,341,409 | 8/1994 | Conrads et al. . |
| 5,354,982 | 10/1994 | Nelson et al. . |
| 5,369,268 | 11/1994 | Van Aller et al. . |
| 5,396,072 | 3/1995 | Schiebel et al. . |
| 5,436,101 | 7/1995 | Fender et al. . |
| 5,440,146 | 8/1995 | Steffen et al. . |
| 5,467,378 | 11/1995 | Lumma et al. . |
| 5,508,507 | 4/1996 | Nelson et al. . |
| 5,510,626 | 4/1996 | Nelson et al. . |
| 5,519,750 | 5/1996 | Heinemann et al. . |
| 5,528,043 | 6/1996 | Spivey et al. . |
| 5,530,238 | 6/1996 | Meulenbrugge et al. . |
| 5,563,421 | 10/1996 | Lee et al. . |
| 5,567,929 | 10/1996 | Ouimette . |
| 5,602,889 | 2/1997 | Oldendorf et al. . |
| 5,637,882 | 6/1997 | Divigalpitiya et al. . |
| 5,652,430 | 7/1997 | Lee . |
| 5,686,732 | 11/1997 | Lumma . |
| 5,723,866 | 3/1998 | Hamilton, Jr. . |
| 5,729,021 | 3/1998 | Brauers et al. . |
| 5,773,839 | 6/1998 | Krepel et al. . |
| 5,812,191 | 9/1998 | Orava et al. . |
| 5,818,052 | 10/1998 | Elabd . |
| 5,818,053 | 10/1998 | Tran . |
| 5,844,243 | 12/1998 | Lee et al. . |
| 5,895,936 | 4/1999 | Lee . |

Primary Examiner—Constantine Hannaher
Assistant Examiner—Andrew Israel
(74) Attorney, Agent, or Firm—Pillsbury Winthrop LLP

(57) ABSTRACT

The present invention discloses a radiation image detector including an ionizing radiation sensing element which is operative to present an imagewise electrostatic charge distribution in response to imagewise ionizing radiation exposure thereof; a charge generator, in non-contact proximity with the radiation sensing element, which is operative to inject charge onto said radiation sensing element; an optical radiation source which projects visible radiation onto the radiation sensing element; and read circuitry, which detects information-bearing signals, representing said imagewise electrostatic charge distribution, the signals being created when the charge generator and the optical radiation source are concurrently activated in generally mutual registration.

24 Claims, 14 Drawing Sheets

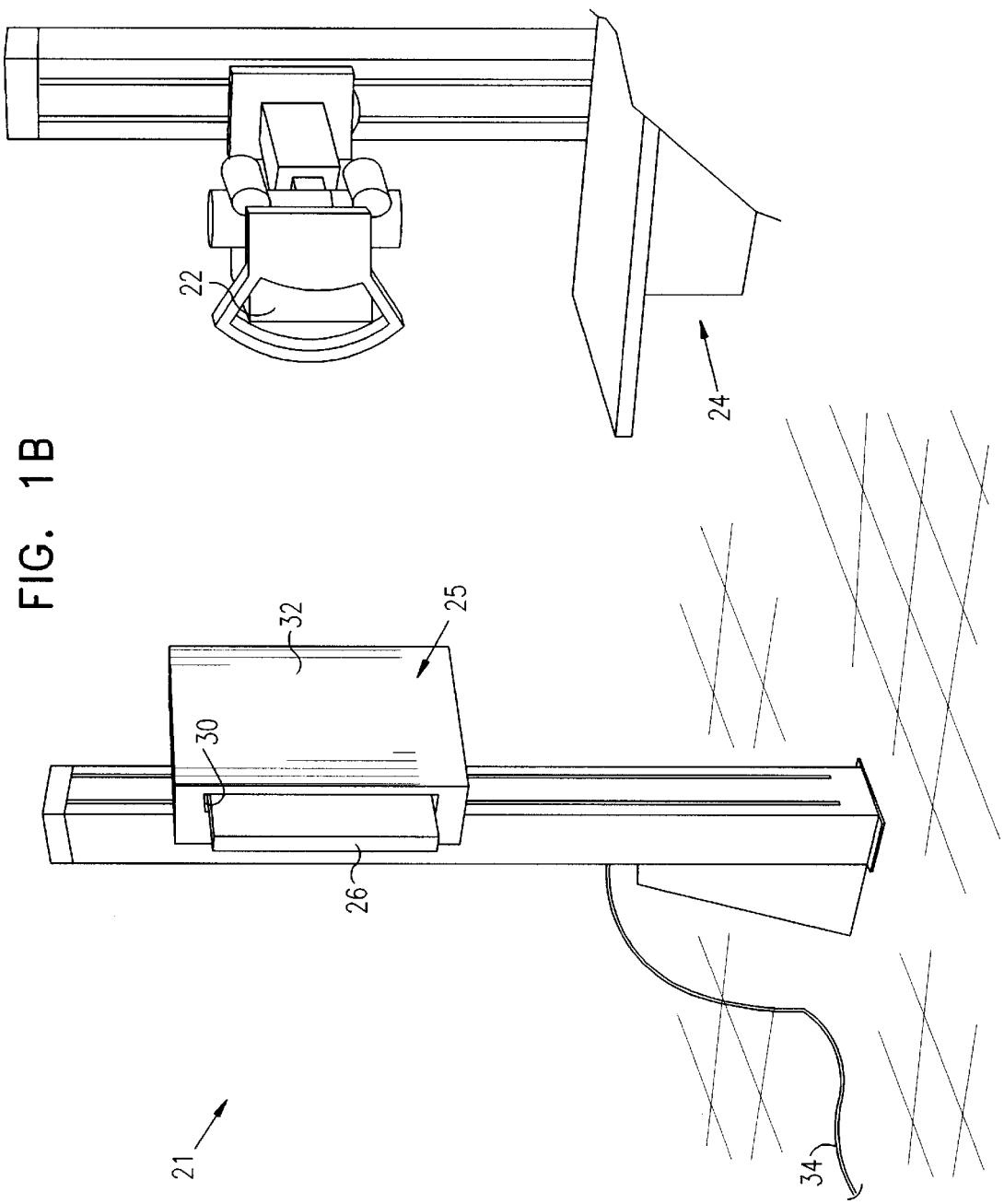

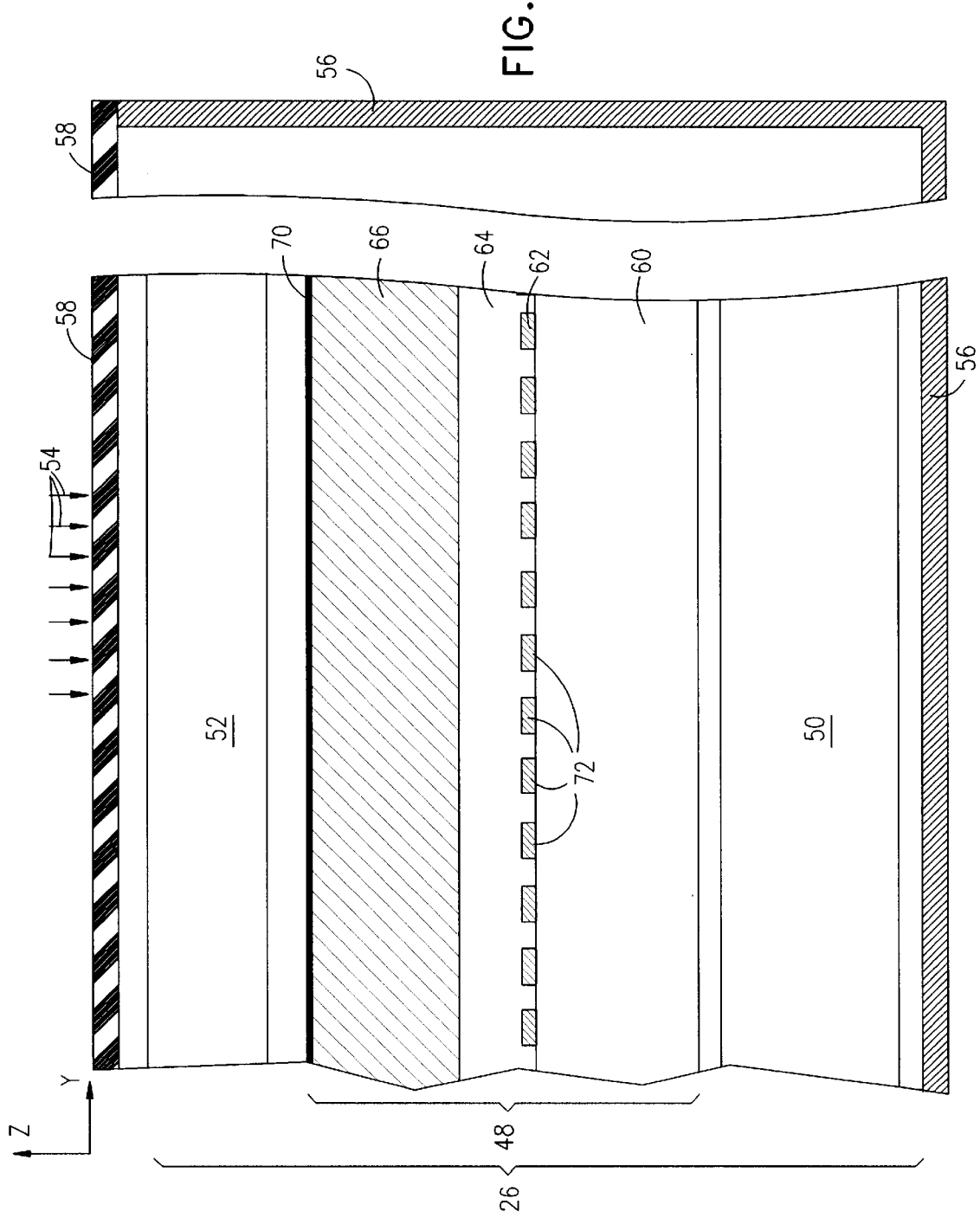

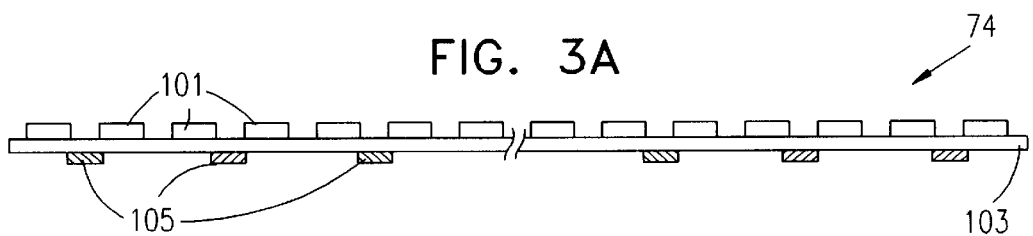
FIG. 3A
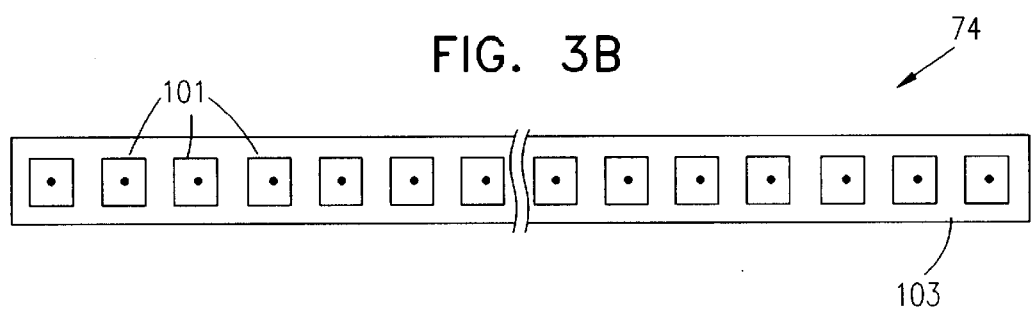
FIG. 3B
FIG. 4
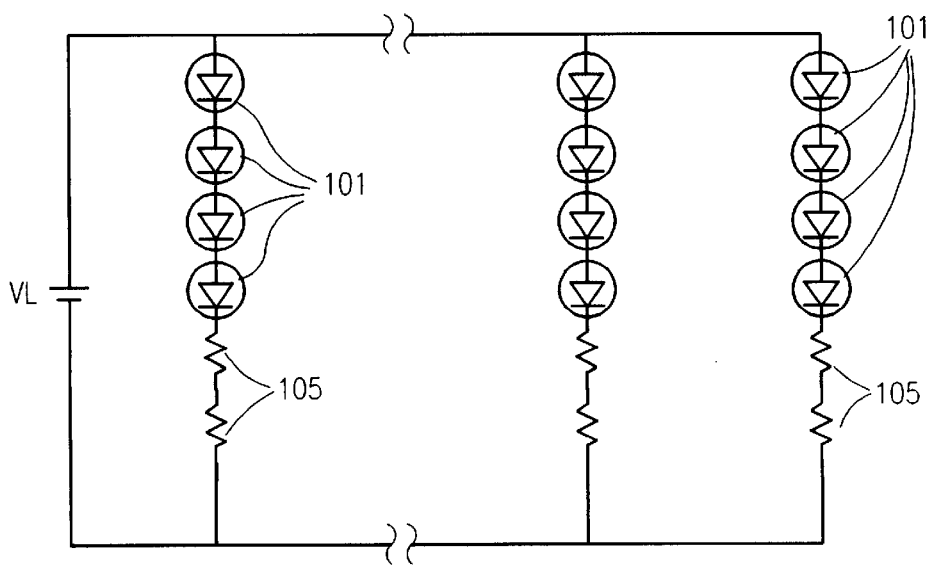

X-RAY IMAGING SYSTEM

REFERENCE TO CO-PENDING APPLICATIONS

This is a continuation in part of U.S. patent application Ser. No. 09/233,320 filed Jan. 20, 1999 and U.S. patent application Ser. No. 0/233,327 filed Jan. 20, 1999.

FIELD OF THE INVENTION

The present invention relates to apparatus and methods for detecting ionizing radiation images and more specifically relates to apparatus and methods for digital detection of X-ray images.

BACKGROUND OF THE INVENTION

There are described in the patent literature numerous systems and methods for the recording of X-ray images. Conventional X-ray imaging systems use an X-ray sensitive phosphor screen and a photosensitive film to form visible analog representations of modulated X-ray patterns. The phosphor screen absorbs X-ray radiation and is stimulated to emit visible light. The visible light exposes photosensitive film to form a latent image of the X-ray pattern. The film is then chemically processed to transform the latent image into a visible analog representation of the X-ray pattern.

Recently, there have been proposed systems and methods for detection of X-ray images in which the X-ray image is directly recorded as readable electrical signals, thus obviating the need for film in the imaging process.

For example, U.S. Pat. No. 4,961,209 to Rowlands et al. describes a method for employing a transparent sensor electrode positioned over a photoconductive layer and a pulsed laser that scans the photoconductive layer through the transparent sensor electrode.

U.S. Pat. No. 5,268,569 to Nelson et al. describes an imaging system having a photoconductive material which is capable of bearing a latent photostatic image, a plurality of elongate parallel strips adjacent the photoconductive material, and a pixel source of scanning radiation.

U.S. Pat. No. 5,652,430 to Lee describes a radiation detection panel for X-ray imaging systems which is made up of a matrix assembly of radiation detection sensors arrayed in rows and columns to record static or dynamic images.

Examples of commercially available systems in which X-ray images are directly recorded as readable electrical signals include the Direct Radiography line of detector arrays offered by Sterling Diagnostic Imaging (formerly DuPont) of Delaware, USA, the Pixium line of flat panel X-ray detectors for radiography offered by Trixell of Moirans, France; the Digital Imaging Center offered by Swissray Medical AG of Switzerland, and the Canon Digital Radiography System offered by the Canon Medical Division of Canon U.S.A.

In addition, digital mammographic X-ray systems are commercially available. For example, the Opdima system offered by Siemens Medical Systems, Inc. of New Jersey, USA.

SUMMARY OF THE INVENTION

The present invention seeks to provide an improved X-ray imaging system and method.

There is thus provided in accordance with a preferred embodiment of the present invention a radiation image detector including an ionizing radiation sensing element which is operative to present an imagewise electrostatic charge distribution in response to imagewise ionizing radiation exposure thereof, a charge generator, in non-contact proximity with the radiation sensing element, which is operative to inject charge onto the radiation sensing element, an optical radiation source which projects visible radiation onto the radiation sensing element; and read circuitry, which detects information-bearing signals, representing the imagewise electrostatic charge distribution, with the signals being created when the charge generator and the optical radiation source are concurrently activated in generally mutual registration.

Further in accordance with a preferred embodiment of the present invention, the imagewise ionizing radiation is imagewise X-ray radiation.

Still further in accordance with a preferred embodiment of the present invention, the ionizing radiation sensing element is a layered stack with the following order: an optically transparent support substrate; an optically transparent conductive layer; an optically transparent dielectric layer; and a photoconductor.

Additionally in accordance with a preferred embodiment of the present invention, the ionizing radiation sensing element is a layered stack with the following order: an optically transparent support substrate; an optically transparent conductive layer; a first dielectric layer; a photoconductor; and a second dielectric layer.

In yet farther accordance with a preferred embodiment of the present invention, the second dielectric layer acts as an optical filter which tailors a radiation spectrum of optical radiation which penetrates into the photoconductor.

Still in further accordance with a preferred embodiment of the present invention, the photoconductor is amorphous selenium or a selenium alloy.

Additionally in accordance with a preferred embodiment of the present invention, the photoconductor is a material selected from the group consisting of lead oxide, thallium bromide, cadmium telluride, cadmium zinc telluride, cadmium sulfide, and mercury iodide.

Preferably, the charge generator of the radiation image detector scans the radiation sensing element.

In further accordance with a preferred embodiment of the present invention, the charge generator includes at least one embedded electrode; at least one exposed screen electrode; with the at least one embedded electrode and the at least one exposed screen electrode separated at a region of proximity by a dielectric medium; an electrical driver which provides an AC voltage between the at least one embedded electrode and the at least one screen electrode causing air discharge at the region of proximity, thus generating positive and negative charges; and a voltage source which provides a DC bias voltage in the range of zero to several thousand volts to the at least one screen electrode, providing the driving force for charge injection.

Additionally, in accordance with a preferred embodiment of the present invention, the DC bias voltage can be selected such that the DC component associated with the Fourier spectrum of spatial frequencies of an image to be detected is reduced.

Preferably, the optical radiation source of the radiation image detector scans the radiation sensing element.

Moreover, in accordance with a preferred embodiment of the present invention, the optical radiation source includes at least one first source of visible radiation which is mainly absorbed at the surface of the photoconductor of the radiation sensing element.

Additionally, in accordance with a preferred embodiment of the present invention, the optical radiation source also includes at least one second source of optical radiation which generally penetrates deeply into the photoconductor of the radiation sensing element.

In further accordance with a preferred embodiment of the present invention, the optical radiation source includes a generally linear array of light emitting diodes.

Still in further accordance with a preferred embodiment of the present invention, the optical radiation source also includes elongate converging optics, and an optical beam shaping enclosure having an elongate opening through which a generally elongate beam of optical radiation may be projected.

Preferably, the generally elongate beam of optical radiation has at least one well-defined elongate edge.

In accordance with a preferred embodiment of the present invention, the read circuitry is removably coupled to the radiation sensing element. Alternately, in accordance with a preferred embodiment of the present invention, the read circuitry is permanently coupled to the radiation sensing element.

There is also provided in accordance with a preferred embodiment of the present invention a module for detection of ionizing radiation images, the module including an ionizing radiation responsive layered substrate arranged to respond to an ionizing radiation image, which includes at least one layer which is segmented into a plurality of parallel strips, and at least one non-segmented layer; and an elongate charge generator operative in association with the ionizing radiation responsive layered substrate to inject charge thereto, transversing at least part of the plurality of parallel strips, and scanning the ionizing radiation responsive layered substrate along a scanning axis which is generally parallel to said strips and a source of visible radiation operative in association with the ionizing radiation responsive layered substrate, projecting an elongated beam of visible radiation which transverses at least part of the plurality of parallel strips, wherein the beam scans the substrate along the scanning axis.

There is also provided in accordance with a preferred embodiment of the present invention, a method for detecting radiation images including the steps of providing an X-ray sensitive layered substrate which converts radiation photons to charge carriers, a scanning charge generator which injects charge onto the layered substrate; a scanning source of optical radiation which projects an elongate light beam onto said layered substrate; and read circuitry creating a first generally uniform charge distribution over the X-ray sensitive layered substrate using the scanning charge generator, exposing the X-ray sensitive layered substrate to imagewise X-ray radiation thereby patterning the uniform charge distribution in correspondence with the imagewise X-ray radiation, creating a second generally uniform charge distribution over the X-ray sensitive layered substrate using the scanning charge injector, detecting the patterned charge distribution using read circuitry by simultaneously and in generally mutual registration activating the scanning source of optical radiation and the scanning charge injector.

In further accordance with the present invention, the method for detecting radiation images also includes the step of reducing the DC component associated with the Fourier spectrum of spatial frequencies of an image to be detected, such that the second uniform charge distribution has a lower charge density than the first uniform charge distribution.

Yet in still further accordance with the present invention, the method for detecting radiation images includes the step of neutralizing space charge trapped in the X-ray sensitive layered substrate by concurrently and in generally mutual registration activating the scanning source of optical radiation and the scanning charge injector.

BRIEF DESCRIPTION OF THE DRAWINGS

The present invention will be more fully appreciated and understood from the following detailed description, taken in conjunction with the drawings in which:

FIGS. 1A and 1B illustrated two alternative embodiments of X-ray imaging systems constructed and operative in accordance with a preferred embodiment of the present invention;

FIGS. 2A and 2B are sectional illustrations taken along lines 2A—2A and 2B—2B respectively of FIG. 1A, illustrating an X-ray image detection module forming part of the systems of FIGS. 1A and 1B;

FIGS. 3A and 3B are simplified cross-sectional illustrations taken along lines 2A—2A of an elongate light source constructed and operative in accordance with a preferred embodiment of the present invention;

FIG. 4 is a simplified electrical circuit diagram of a power supply for the light source of FIGS. 3A and 3B;

DETAILED DESCRIPTION OF THE DRAWINGS

Figure 1A:
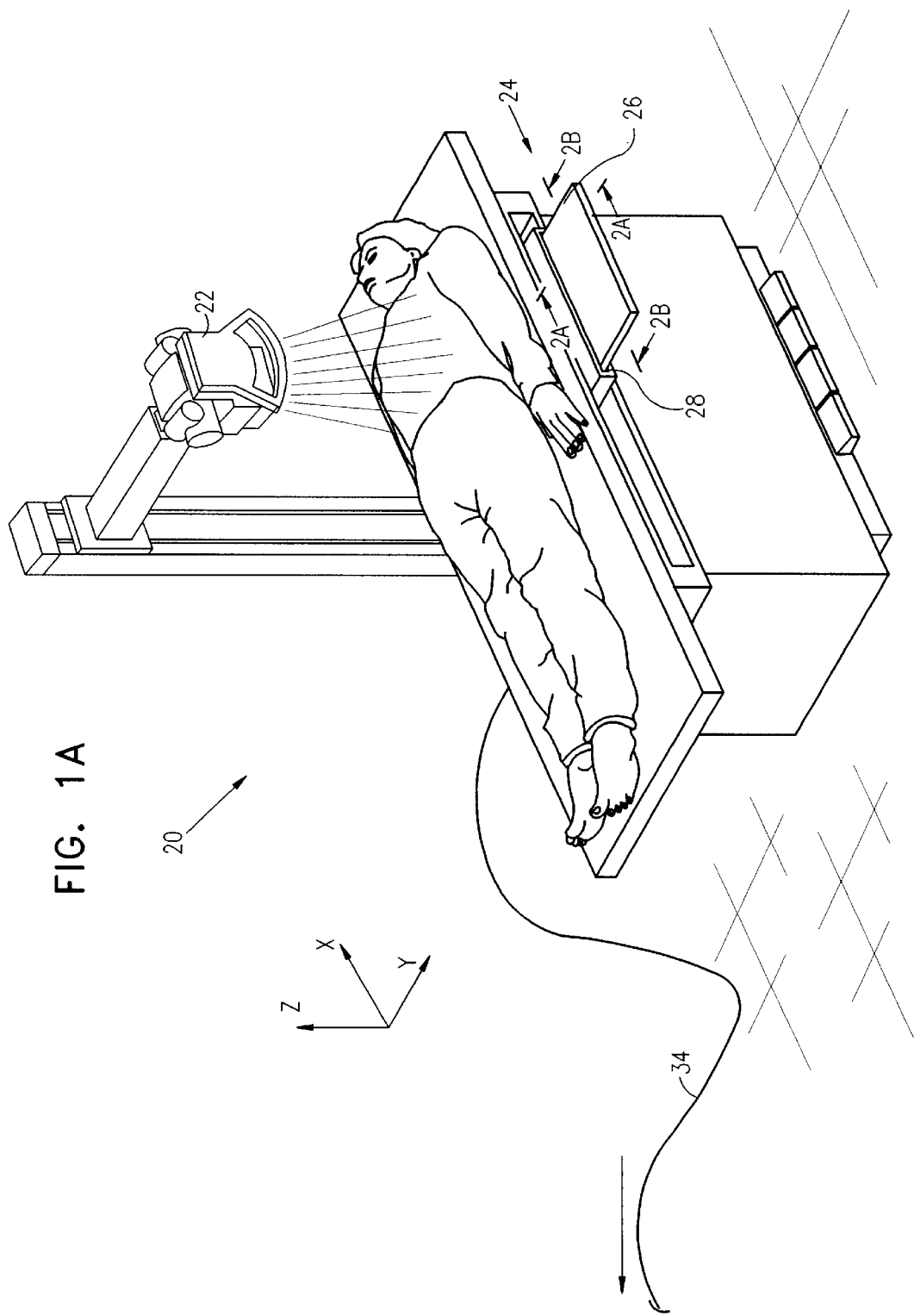

Reference is now made to FIGS. 1A and 1B which illustrate X-ray systems for digital X-ray detection incorporating an X-ray image detection module in accordance with preferred embodiments of the present invention.

FIGS. 1A and 1B illustrate X-ray systems 20 and 21, respectively, which may be of the type sold by Philips Medical Systems, the Fischer Imaging Corporation, the Bennett subsidiary of Trex Medical Corporation, etc, X-ray systems 20 and 21 include a source of X-ray radiation 22, an X-ray table 24 (FIG. 1A) and/or a vertical chest stand 25 (FIG. 1B), and further incorporate an X-ray image detection module 26, which obviates the need for a standard film cartridge. It is appreciated that the source of X-ray radiation 22 can be swiveled for use with vertical chest stand 25 as shown in FIG. 1B.

In accordance with one embodiment of the invention, image detection module 26 may be a flat-panel detection assembly, which is insertable into the bucky/grid device opening 28 of X-ray table 24 or an opening 30 of a bucky/grid device 32 mounted on vertical chest stand 25. It is appreciated that image detection module 26 may be designed with size dimensions suitable for use with standard mammography systems.

Alternatively, image detection module 26 may form an integrated element of conventional medical/diagnostic X-ray (e.g. bucky devices, X-ray tables, and vertical chest stands) or mammography systems.

During imaging, a patient to be imaged reclines on X-ray table 24 or, alternatively, stands in front of vertical chest stand 25, positioned so that an area of the patient to be imaged lies intermediate the source of X-ray radiation 22 and the image detection module 26. When the source of X-ray radiation 22 is activated, X-ray image detection module captures and "reads" the resulting X-ray image as described herein and outputs an electrical signal representation thereof The electrical signal representation may be transferred to a workstation (not shown) via a communications cable/optical link 34 for display, diagnostics, processing and archiving.

Figure 2B:
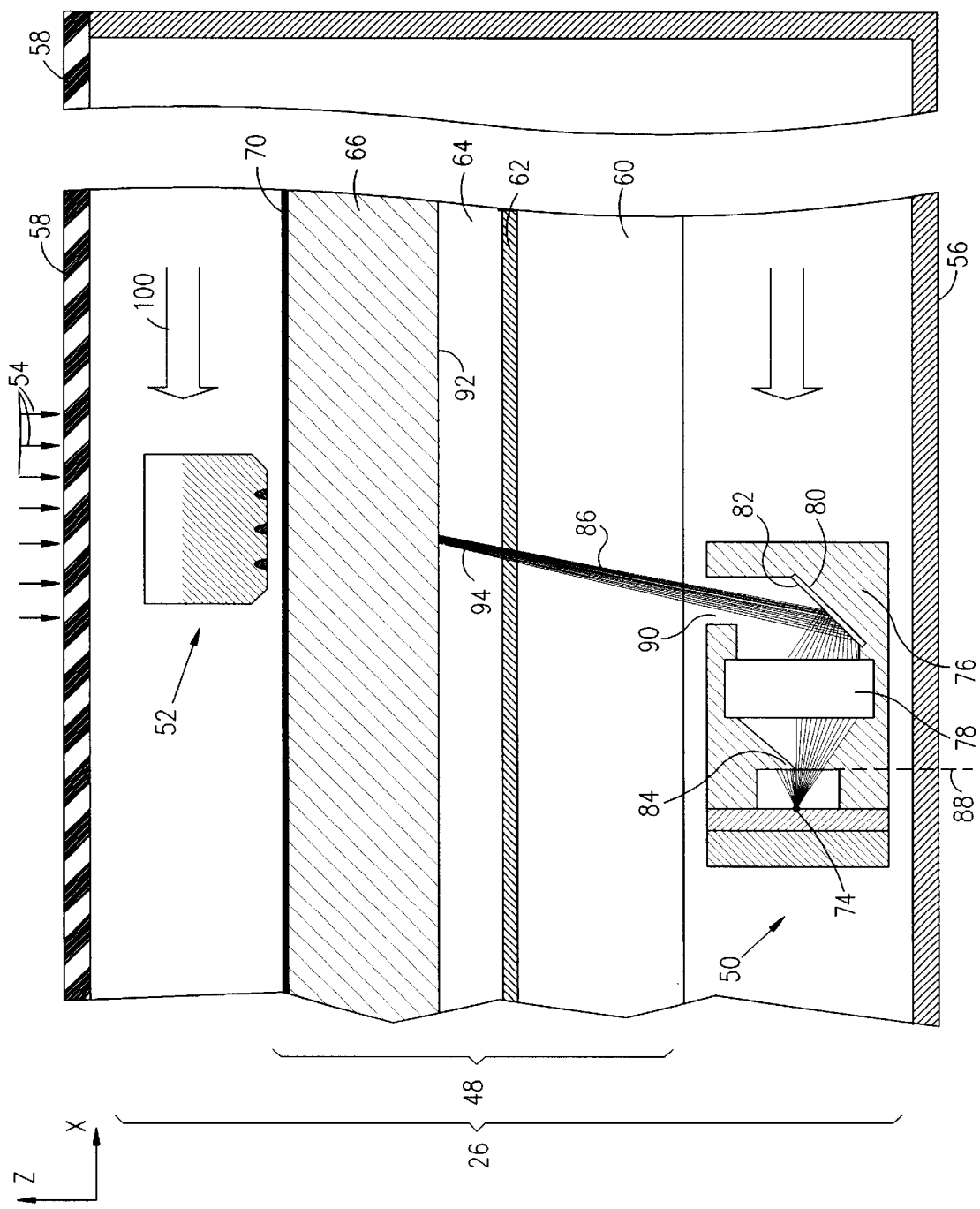

Reference is now made to FIGS. 2A and 2B which are mutually perpendicular cross-sectional views of image detection module 26.

Image detection module 26 includes a detection assembly 48, an elongate optical radiation source 50 and an elongate charge injector 52. The detection assembly 48, which is exposed to incident radiation 54 representing an X-ray image, is preferably enclosed by a housing 56 having an upper X-ray permeable cover 58.

Detection assembly 48 preferably comprises a layered stack having a dielectric support substrate 60, a conductive electrode array 62 formed onto and overlying the support substrate 60, a dielectric layer 64 overlying the conductive electrode array 62, an X-ray sensitive layer 66 overlying the dielectric layer 64 and a very thin top dielectric layer 70 overlying the X-ray sensitive layer 66.

Support substrate 60 provides mechanical support and dimensional stability for detection assembly 48 and may have served as a base upon which subsequent layers 62–70 were formed. In addition, support substrate 60 provides electrical insulation for conductive electrode array 62. Preferably, support substrate 60 is an optically transparent panel, several millimeters thick (approximately 1 mm–5 mm), having a flat, relatively flawless top surface. Preferably support substrate is formed of glass or other transparent substrates that are compatible with vacuum deposition processes. Examples of suitable materials for support substrate 60 are Corning glass 7059 and 1737 and Schott AF-45.

In accordance with alternative embodiments of the present invention, support substrate 60 and overlying layers 62–70 may be non-planar (e.g. concave) to provide a curved detection assembly.

In accordance with a preferred embodiment of the present invention, conductive electrode array 62 comprises a plurality of strip electrodes 72 which are preferably elongate and parallel and which end in fan-out regions (not shown).

Conductive electrode array 62 is preferably formed using photolithography and microetching techniques to pattern and segment a generally continuous conductive film which is deposited on a surface of support substrate 60. Alternatively, thermal ablation techniques (e.g. laser etching) can be used for patterning and segmentation of the conductive film.

The conductive film, which is preferably a transparent indium tin oxide (ITO), is typically deposited on support substrate 60 using conventional vacuum deposition techniques, to provide a uniform layer which is typically 1,000–10,000 angstroms thick.

Alternatively the conductive film may be a thin metallic coating, e.g. aluminum or gold, which is sufficiently thin so as to exhibit a high degree of transparency to radiation in the visible spectrum.

The pitch of adjacent strip electrodes 72 of conductive electrode array 62 determines the resolution of detection assembly 48 in one direction.

For example, resolutions of 10–20 lines per millimeter can be achieved using strip electrodes 72 having a pitch of 100–50 microns, respectively. Preferably, the width of each strip electrode 72 is two to four times greater than the gap between adjacent electrodes.

Figure 9:
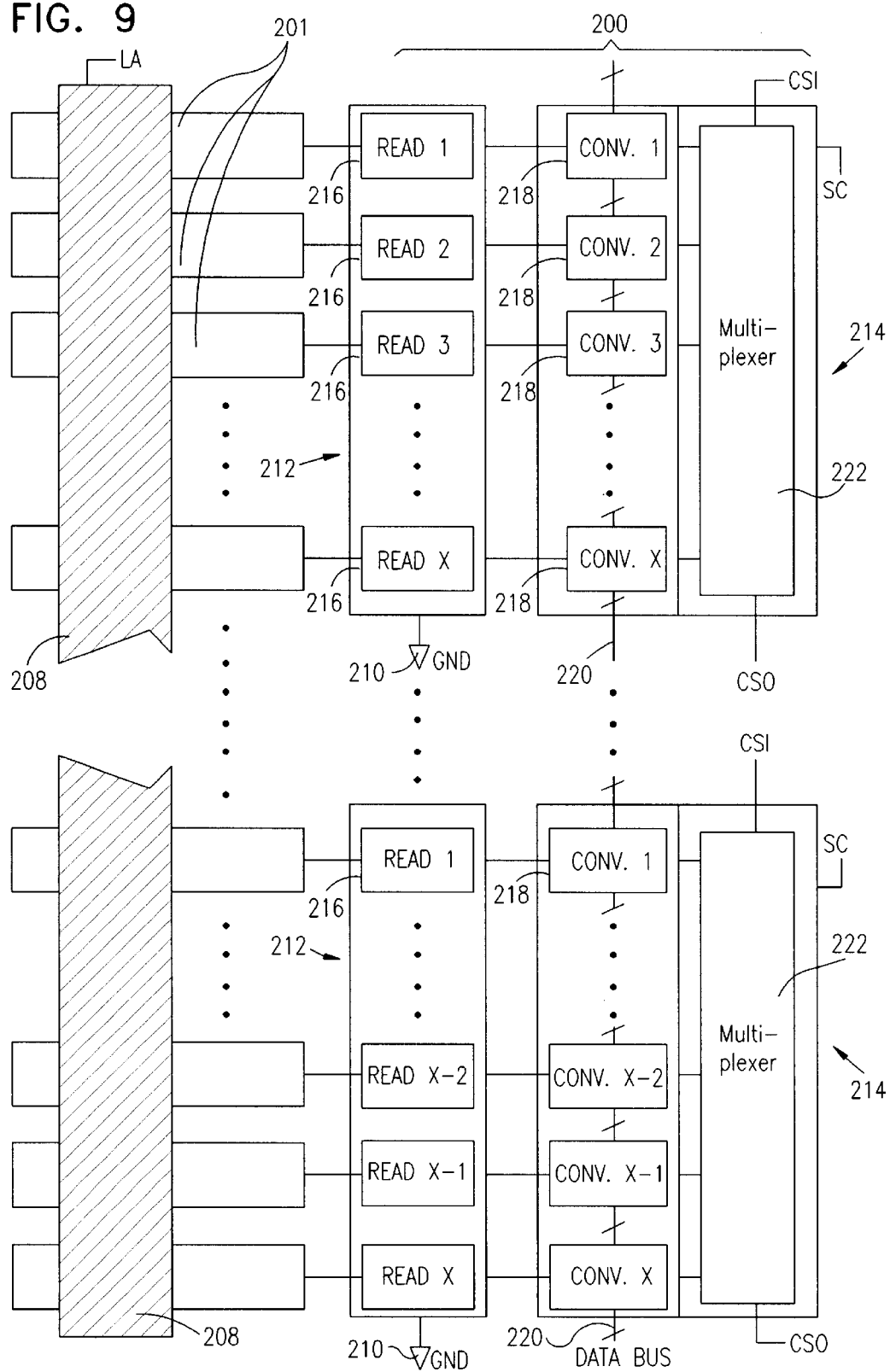
FIG. 9 is a simplified illustration of read-out electronics employed in the X-ray image detection module of FIGS. 1A–8 in accordance with one embodiment of the present invention.
Figure 10:
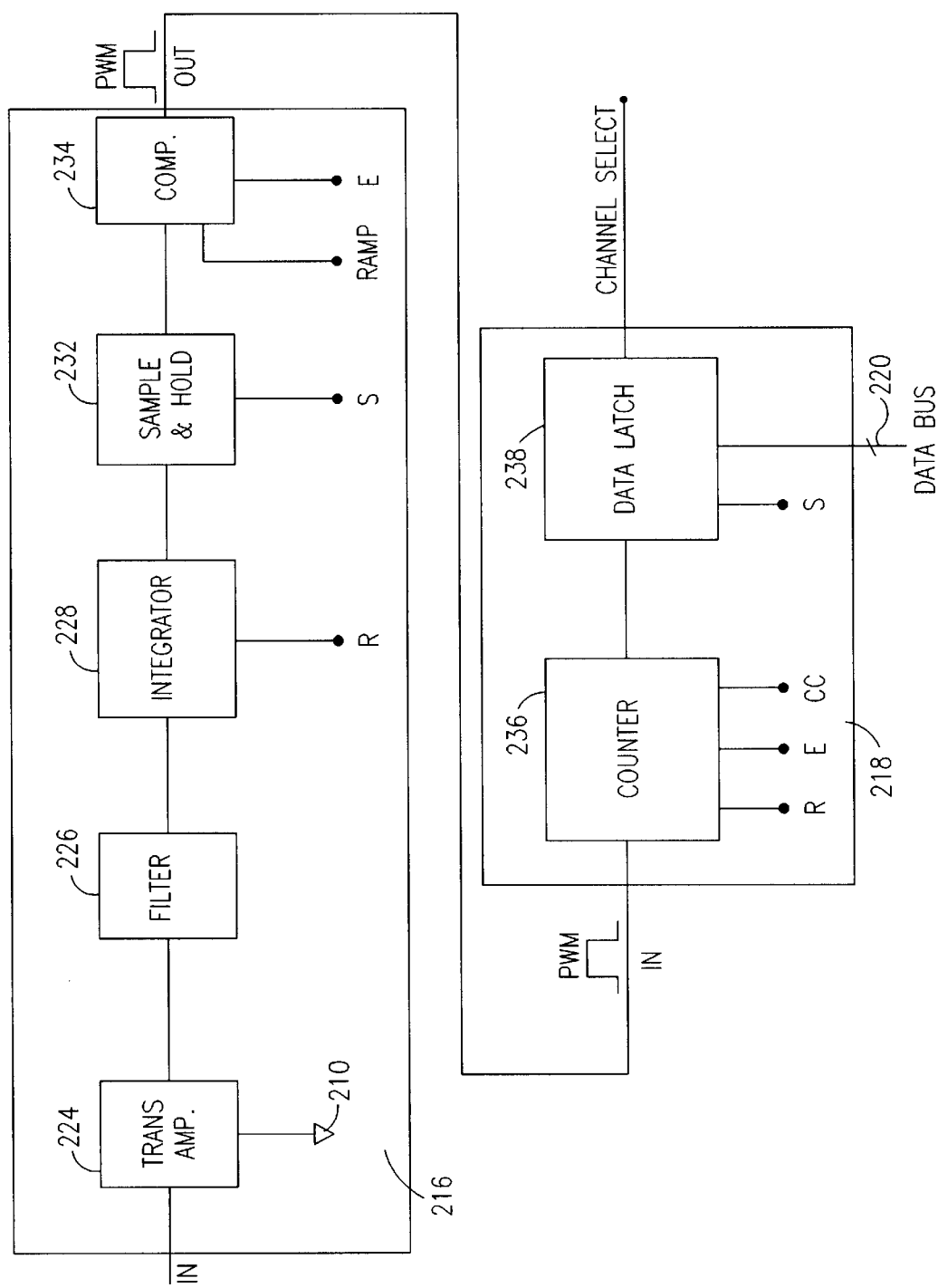
FIG. 10 is a block diagram illustration of portions of the apparatus of FIG. 9.
Figure 11:
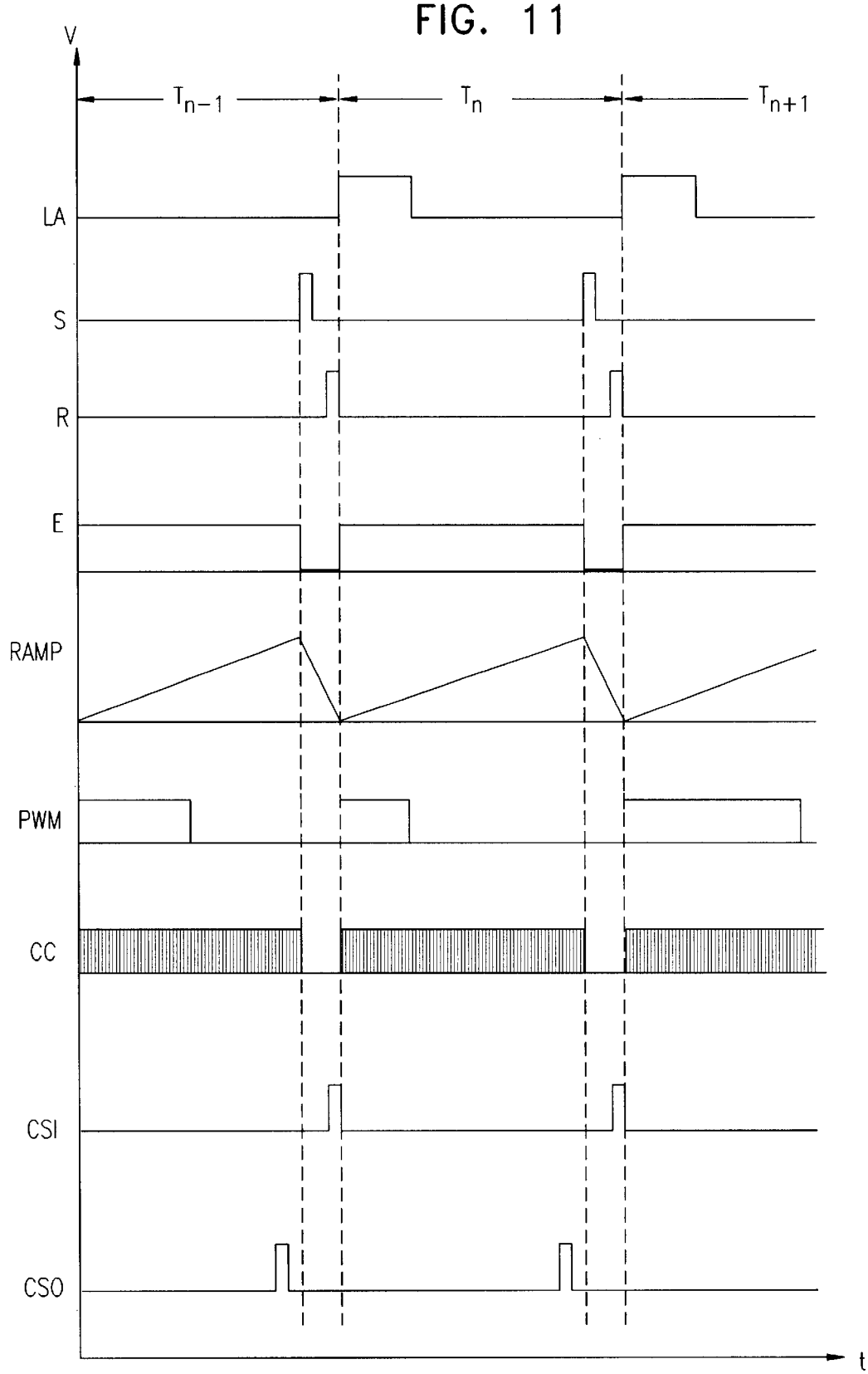
FIG. 11 is a timing diagram useful in understanding of the operation of the X-ray detection module of FIGS. 1A–9.

Typically, readout electronics, which are described hereinbelow with reference to FIGS. 9–11, are connected to connection fan-out regions (not shown) of conductive electrode array 62. The connection region, which may be at one or more non-active locations of detection assembly 48, are provided in order to enable standard electronic connection technologies (e.g. chip-on-glass, flip-chip) to be used. Preferably, non-active locations are located at the periphery of detection assembly 48. Alternatively, removable connection technologies (e.g. silicon rubber zebra connectors) may be used.

Dielectric layer 64 overlies and electrically insulates conductive electrode array 62. Preferably it fills the gaps between adjacent strip electrodes 72.

The material properties desirable for dielectric layer 64 include volume resistivity which is greater than $10^{14}$ ohms/centimeter and which is preferably in the range of $10^{16}$ ohms/centimeter, high dielectric strength (preferably in the range of 50 volts/micron or higher), optical transparency to radiation in the visible spectrum, a low dielectric constant ($\in_d \cong 2$), and suitability to serve as a smooth accepting substrate for subsequent layers which may be deposited thereon using vacuum thermal evaporation or sputtering deposition techniques or chemical vapor deposition (CVD).

An example of a suitable material for dielectric layer 64 is silicon monoxide/dioxide which may be applied using chemical vapor deposition (CVD), vacuum deposition, sol-gel processes or other appropriate techniques.

Preferably, dielectric layer 64 is highly uniform with a thickness ($d_d$) in the range of 10–80 microns. Preferably, the thickness of dielectric layer 64 is selected to be less than half of the pitch between strip electrodes 72 in order for the detector resolution to maintain the pitch resolution. This desired thickness is determined by solving the electrostatic problem with the boundary conditions associated with conductive electrode array 62 and dielectric layer 64.

X-ray sensitive layer 66, which overlies dielectric layer 64, preferably exhibits properties which make it suitable to act as an X-ray imaging material—i.e. following exposure to incident photons, the material generates a suitable number of extractable free electron hole pairs with preferably high charge carrier mobility and lifetime. In addition, X-ray sensitive layer 66 preferably exhibits generally high dark resistivity, allowing an electric field to be maintained thereacross for a period of time required for X-ray exposure and reading. Furthermore, the density of charge carrier trap sites in X-ray sensitive layer 66 is preferably low.

X-ray sensitive layer 66 may comprise amorphous selenium, selenium alloys, lead oxide, thallium bromide, cadmium zinc telluride, cadmium sulfide, mercury iodide or any other such material that exhibits X-ray sensitivity in the radiation spectrum of interest.

Typically for medical imaging applications, the X-ray photon energy spectrum ranges from 18 keV (mammography) to 150 keV (general radiography). Preferably, the thickness ($d_p$) of X-ray sensitive layer 66 is sufficient to allow absorption of approximately 50% or more of the flux of the incident X-ray radiation 54 as further described hereinbelow. For example, when using amorphous selenium or selenium alloys, the layer thickness required to achieve at least 50% absorption ranges from approximately 30 microns (at 18 keV) to 600 microns (at 150 keV).

A limiting factor in determining the overall thickness of X-ray sensitive layer 66 is the desired capacitive relationship between X-ray sensitive layer 66 and dielectric layer 64. Generally, and in order to achieve good responsivity of detection assembly 48, the following capacitive ratio should be maintained:

$$4 > (\epsilon_d/d_d)/(\epsilon_p/d_p) \geq 1 \quad \text{(Eq. 1)}$$

where $\epsilon_p$=dielectric constant of X-ray sensitive layer 66; and
$d_p$=thickness of X-ray sensitive layer 66; and
$\epsilon_d$=dielectric constant of dielectric layer 64; and
$d_d$=thickness of dielectric layer 64;

In order for the conversion efficiency from X-ray to charge to be maximized, the thickness $d_p$ of X-ray sensitive layer 66 should be as high as possible. Accordingly, in order to maximize the spatial resolution of the detector, the thickness of dielectric layer 64, $d_d$, should be as low as possible. In light of the above and in order to allow values $d_d$ and $d_p$ to be in the optimal range as described by the constraints of Eq. 1 hereinabove, a material for dielectric layer 64 with a relatively low dielectric constant $\epsilon_d$ (i.e. $\epsilon_d \approx 2$) should be selected.

When using the materials mentioned hereinabove for X-ray sensitive layer 66 and a material with a relatively low dielectric constant for dielectric layer 64, $\epsilon_p$ is two to six times greater than $\epsilon_d$. As a result and in accordance with Eq. 1, the thickness $d_p$ of X-ray sensitive layer 66 can be approximately one order of magnitude greater than thickness $d_d$ of dielectric layer 64.

Top dielectric layer 70 is preferably highly uniform with a thickness in the range of 0 (no layer) to several tens of microns. Preferably, the thickness of top dielectric layer 70 is several microns. Top dielectric layer 70, which preferably serves as a charge accepting layer, may also serve as an optical filter, as a passivation layer or as a combination thereof The material properties desirable for top dielectric layer 70 include volume resistivity which is greater than $10^{14}$ ohms/centimeter. In addition, top dielectric layer 70 may serve as an optical filter which absorbs a selected optical radiation spectrum, e.g. undesired UV and visible radiation, preventing penetration of said radiation into X-ray sensitive layer 66.

Top dielectric layer 70 may further serve as a physical and/or chemical passivation layer for X-ray sensitive layer 66. When amorphous selenium is used for X-ray sensitive layer 66, examples of a suitable passivation material for top dielectric layer 70 are polymers such as poly-para-xylylenes which may be applied as a conformal coating in a room-temperature vacuum coating operation.

Shown in FIG. 2B is a cross-section of the elongate optical radiation source 50 which includes a light source assembly 74, an optical enclosure 76 and converging optics 78 in accordance with a preferred embodiment of the invention.

Preferably, light source assembly 74 includes a plurality of quasi-point sources. According to a preferred embodiment of the present invention, quasi-point sources are light emitting diodes (LEDs) arranged in at least one linear array as described hereinbelow with reference to FIGS. 3A and 3B.

Converging optics 78 can be implementing using various cylindrical lens structures (not shown) in order to obtain one-dimensional light focussing as known in the art.

Optical enclosure 76 preferably comprises an elongate facet 80 having an inner reflective surface 82 and an elongate edge 84 which acts as an optical barrier for light emitted from light source assembly 74.

A generally elongate light beam 86 emitted from light source assembly 74 is first shaped by elongate edge 84 in the Z-Y plane, defining an object plane indicated by dashed line 88. Beam 86 is then focussed by converging optics 78, and finally projected by inner reflective surface 82, through an elongate opening 90 of optical enclosure 76, onto X-ray sensitive layer 66.

The geometrical relationship between light source assembly 74, elongate edge 84, converging optics 78, elongate facet 80, and the optical distance of elongate light beam 86 until impingement onto X-ray sensitive layer 66 are selected such that an interface 92 between X-ray sensitive layer 66 and dielectric layer 64 serves as an imaging plane for the object plane 88.

As a result, the shape of elongate light beam 86 as it impinges on X-ray sensitive layer 66 includes at least one sharply defined elongate edge 94, shaped by the elongate edge 84 of optical enclosure 76 and converging optics 78. It should be noted that the width of elongate light beam 86 in the x-direction is typically greater than the width of a single pixel (one raster line) and may extend over a width including many pixels (many raster lines).

It is appreciated that use of converging optics 78 in the described embodiment allows delivery of increased radiating power along sharply defined elongate edge 94 of elongate light beam 86. Preferably, when passing through the lower optically transparent layers of detection assembly 48, elongate light beam 86 undergoes minimal absorption and reflection losses.

Elongate edge 94 of elongate light beam 86 is preferably offset by a predefined angle (not shown) from a normal to interface 92. This is to ensure that light reflected by any interface between layers of detection assembly 48 (FIGS. 2A and 2B), through which elongate light beam 86 is transmitted before reaching interface 92, propagates away from elongate edge 94.

Typically, elongate optical radiation source 50, which transverses conductive electrode array 62, is capable of sweeping back and forth in the x-direction using electro-mechanical means (not shown) to provide linear motion thereof along linear guides (not shown).

In the z-direction, the spacing between elongate optical radiation source 50 and detection assembly 48 is generally fixed at a predetermined distance which is typically 0.2 mm–2 mm. The precise distance is not critical and is selected in accordance with general design considerations of image detection module 26.

Preferably, and in order to achieve a fairly compact image detection module 26, the height of elongate optical radiation source 50 in the z-dimension is fairly low, e.g. 5–15 mm.

FIG. 2B shows a cross section of elongate charge injector 52 which may be operative to inject charge into top dielectric layer 70. Preferably, elongate charge injector 52, which is capable of sweeping back and forth in the x-direction along axis 100 over top dielectric layer 70 using conventional electromechanical means (not shown) to provide linear motion thereof along conventional linear guides (not shown) is as described hereinbelow with reference to FIGS. 5A and 5B.

Elongate charge injector 52 and elongate light source 50 may be mounted on the same guide assembly (not shown) which travels along conventional linear guides, with the elongate charge injector held a fixed distance above the detection assembly 50 and the elongate light source held a fixed distance below detection assembly 50. Thus, the same electromechanical means may be used to provide linear motion for elongate charge injector 52 and for elongate light source 50, which preferably scan in mutual registration.

In the z-direction, the spacing between elongate charge injector 52 and top dielectric layer 70 is generally fixed at a predetermined distance which is typically 0.2 mm–1 mm.

Preferably, and in order to achieve a fairly compact and generally flat image detection module 26 (FIGS. 1A and 1B), the z-dimension of elongate charge injector 52 is fairly small, e.g. 5–15 mm.

Reference is made to FIGS. 3A and 3B which respectively illustrate side and top views of a preferred embodiment of light source assembly 74 in accordance with the present invention. Light source assembly 74 preferably includes a plurality of light emitting diode chips (LEDs) 101 arranged in an elongate array and preferably surface mounted to one side of a rigid printed circuit board (PCB) 103.

Preferably, a plurality of resistors 105, which control the current flowing through the LEDs 101, and thus LED brightness, are surface mounted on the opposite side of PCB 103.

In accordance with one embodiment of the present invention, light source assembly 74 may include reading LEDs and erasing LEDs arranged in a periodic pattern comprising one or more linear arrays. Alternatively, light source assembly 74 may comprise a single linear array of reading LEDs which are activated during the step of erasing as described hereinbelow.

Reading LEDs, activated during the reading step as described hereinbelow, are selected such that the radiation spectrum emitted is coincident with the sensitivity of the X-ray sensitive layer so that the emitted light is highly absorbed in a very thin surface layer (several microns) of the X-ray sensitive layer. For example, when selenium is used for X-ray sensitive layer 66 (FIGS. 2A–2B), light source assembly 74 preferably emits blue light with a peak wavelength of approximately 470 nanometers. Examples of suitable blue light emitting LEDs are Indium gallium-nitride/Gallium-nitride/Silicon carbide blue LEDs of the types available from Hewlett-Packard, Nichia Chemical Industries, Ltd. or Cree Research.

Erasing LEDs, activated during the erasing step as described hereinbelow, are selected so that the emitted light at least partially penetrates through the X-ray sensitive layer. For example, when selenium is used for X-ray sensitive layer 66 (FIGS. 2A–2B), an array of white LEDs may be incorporated into the elongate array of LEDs 101. An example of suitable white light emitting LEDs are those available from Nichia Chemical Industries Ltd., which combine blue LEDs and phosphor technology.

It is appreciated that during the erasing step, both erasing LEDs and reading LEDs may be activated in order to flood the X-ray sensitive layer with a wide spectrum of optical radiation. Alternatively, in accordance with the embodiment that does not comprise erasing LEDs, only reading LEDs are activated during erasing.

It is appreciated that the example described herein provides one non-limiting embodiment of elongate light source 50 and that alternative light sources, e.g. an aperture fluorescent lamp are possible.

The LEDs of light source assembly 74 are collectively driven by an external power source as shown in FIG. 4.

Reference is now made to FIG. 4, which is an electrical circuit diagram illustrating an embodiment of a power supply circuit for illuminating the array of LEDs 101 mounted on PCB 103. Preferably, LEDs 101 are driven by a single DC voltage source VL which is typically on the order of several tens of volts.

Preferably, LEDs 101 are divided into parallel-connected groups. Within each group, the LEDs 101 are serially connected to one or more current-limiting resistors 105. It is appreciated that the use of more resistors allows better heat dissipation to the area surrounding the LEDs 101.

Figure 5A:
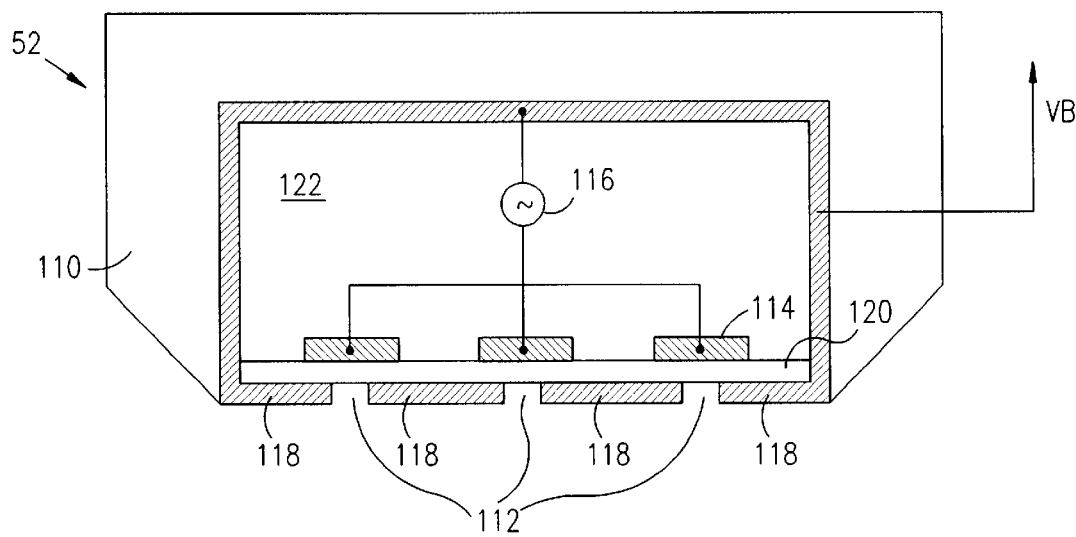
FIGS. 5A and 5B are simplified cross-sectional illustrations of an elongate scanner of the X-ray image detection module of FIGS. 2A and 2B.
Figure 5B:
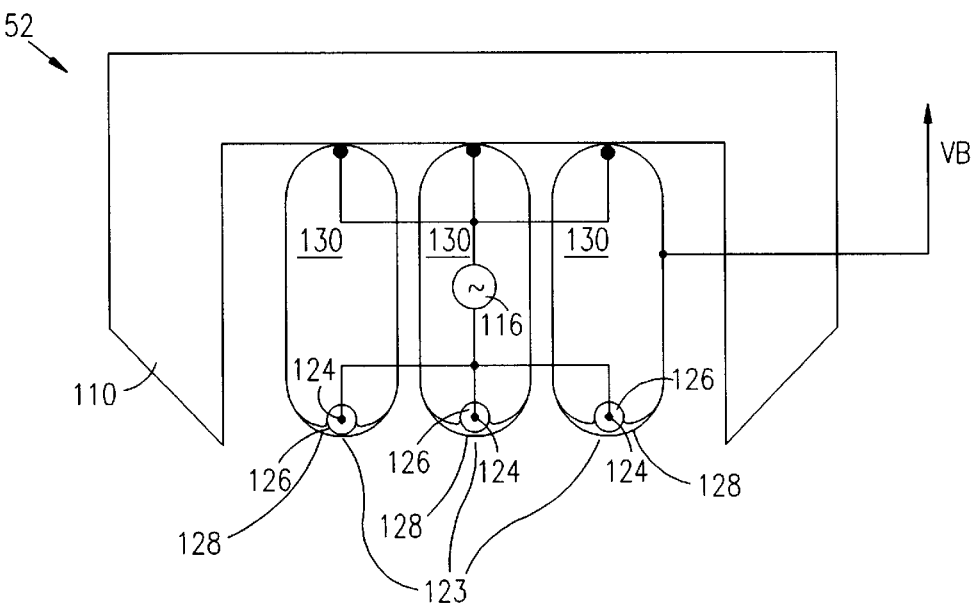

Reference is now made to FIGS. 5A and 5B which are illustrate cross-sections of two alternative non-limiting embodiments of the elongate charge injector 52 of FIGS. 2A and 2B, in accordance with preferred embodiments of the present invention.

Elongate charge injector 52 typically includes an electrically insulating housing assembly 110 and a plurality of charge generation regions 112, which are preferably elongate. Each charge generation region 112 is associated with an embedded elongate electrode 114.

Charge generation regions 112 generate positive and negative charges as follows:

An AC voltage which is typically is of the order of 2000–2,500 volts peak-to-peak and having a frequency of between several tens of kilohertz to several megahertz, is applied by a voltage source 116 across embedded elongate electrodes 114 and exposed screen electrodes 118. Exposed screen electrodes 118 preferably comprises a plurality of individual conductive electrodes, which are electrically connected. Alternatively, exposed screen electrodes 118 may be formed by a single perforated conductive electrode.

A thin dielectric layer 120 separates embedded elongate electrodes 114 from exposed screen electrodes 118 at their regions of closest proximity. Thin dielectric layer 104, which is typically several tens of microns thick, may be any suitable dielectric material withstanding electrical discharge in air, e.g. silicon dioxide.

An inner dielectric support 122, which is preferably glass or ceramic, defines the geometry of and supports elongate screen electrodes 118 as well as embedded elongate electrodes 114.

The relationship between and the geometry of embedded elongate electrodes 114, exposed screen electrodes 118 and thin dielectric layer 120 determine the capacitance and therefore the electrical impedance of elongate charge injector 52 which is driven by the AC voltage source 116.

The AC yoltage applied across embedded elongate electrodes 114 and exposed screen electrodes 118 is selected to produce an AC electric field sufficiently strong to cause air discharge resulting in the generation of a relatively large quantity of positive and negative charges at charge generation regions 112, a fraction of which may then be extracted and injected onto top dielectric layer 70 (FIGS. 2A and 2B).

FIG. 5B illustrates an alternate embodiment of elongate charge injector 52 (FIG. 2A) having a plurality of elongate charge generation regions 123. Each charge generation region 123 is associated with an embedded electrode 124 having a thin dielectric layer 126, which is preferably a thin conductive wire having a glass coating. An exposed screen electrode 128 may be formed of another thin conductive wire having a thickness of several tens of microns. The thin conductive wire is preferably wound into generally spaced coils over an inner dielectric support 130, which may be a glass or ceramic elongate structure, and over the embedded electrode 124 and its thin dielectric layer 126.

The embodiments of FIGS. 5A and 5B, which are non-limiting examples, show three charge generation regions 123. Typically the space (in the X-direction) between adjacent charge generation regions 123 is several millimeters.

In the embodiments of FIGS. 5A and 5B, charges (positive or negative) are preferably injected from the charge generation regions onto top dielectric layer 70 by injection forces created when a bias voltage VB is applied between the exposed screen electrodes and the conductive electrode array 62 (FIGS. 2A and 2B). Typically bias voltage VB is a DC voltage in the range of 0–5000 volts.

Preferably, and in order to effectively allow the injection of the thus generated charges into top dielectric layer 70 to be controlled by bias voltage VB, the exposed screen electrodes are configured to electrostatically shield the embedded electrode from top dielectric layer 70 and from the underlying layers of detection assembly 48 (FIG. 2A).

Typically, charge injection from elongate charge injector 52 onto top dielectric layer 70 is self-quenching. Space charges created by the accumulation of charge on top dielectric layer 70 progressively reduce the injection forces to a generally negligible value. Thus, the controlling factor in determining the polarity and density of charge accumulated on top dielectric layer 70 is the amplitude and polarity of bias voltage VB.

Because the injection can include charges of either polarity, an initial or residual charge on top dielectric layer 70 does not generally influence the final accumulated charge density. Instead, the final accumulated charge density (i.e. the apparent surface voltage) is determined by bias voltage VB.

Insulating housing assembly 110, which is preferably made of a suitable dielectric material, provides elongate charge injector 52 with electrical insulation from its surroundings.

Reference is now to made to FIGS. 6A–6E which illustrate the operation of an image detection module 146 constructed and operative in accordance with a preferred embodiment of the present invention, which may serve as image detection module 26 in the embodiment of FIGS. 1A–5B.

Figure 6A:
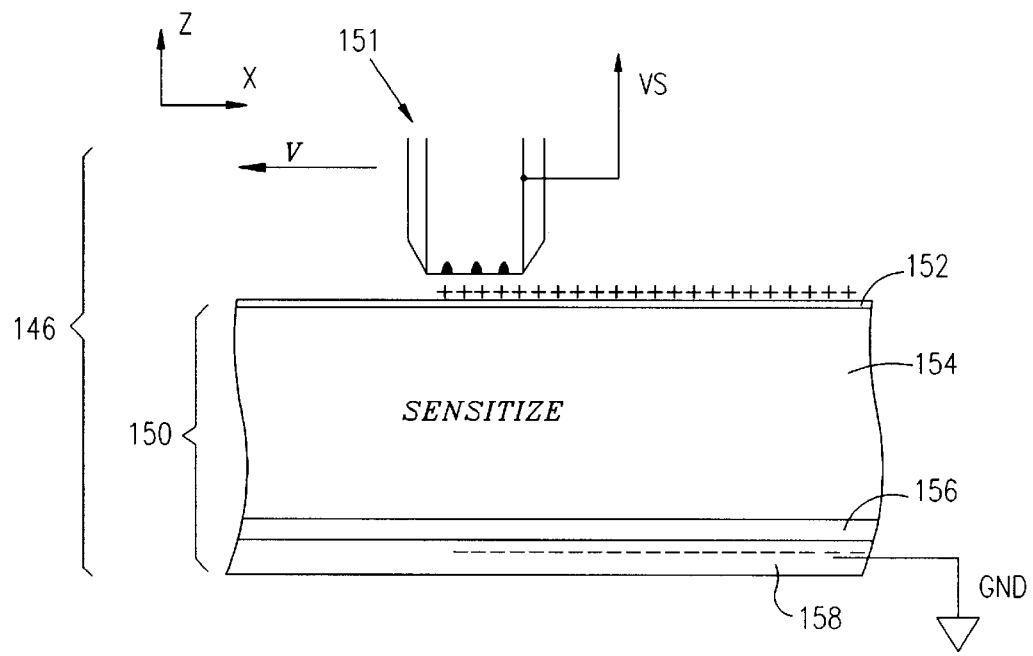
FIGS. 6A, 6B, 6C, 6D and 6E are simplified illustrations showing operation of the X-ray image detection module of FIGS. 2A–5B.
Figure 6B:
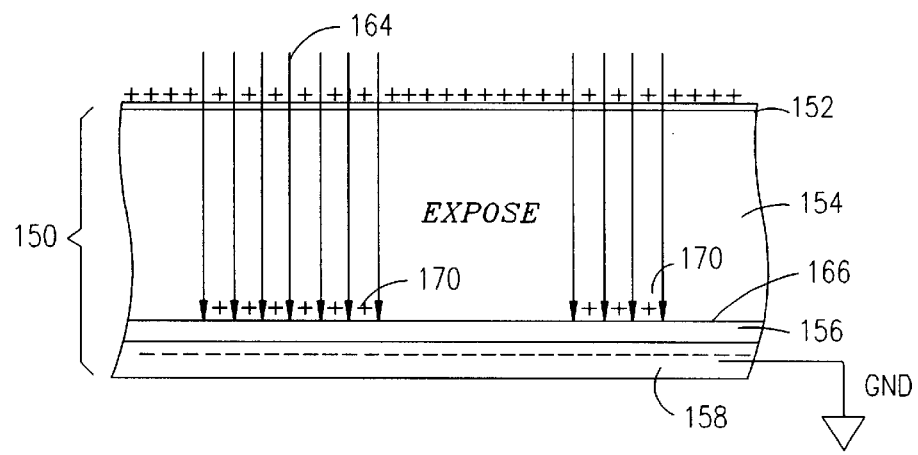
Figure 6C:
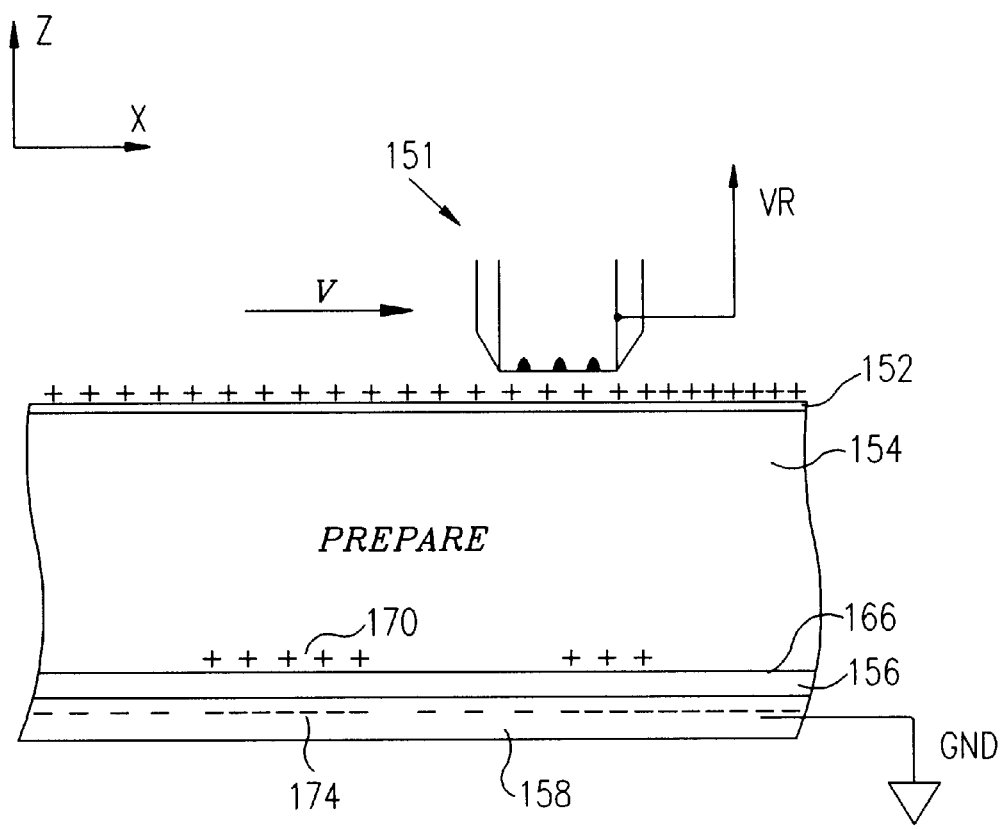
Figure 6D:
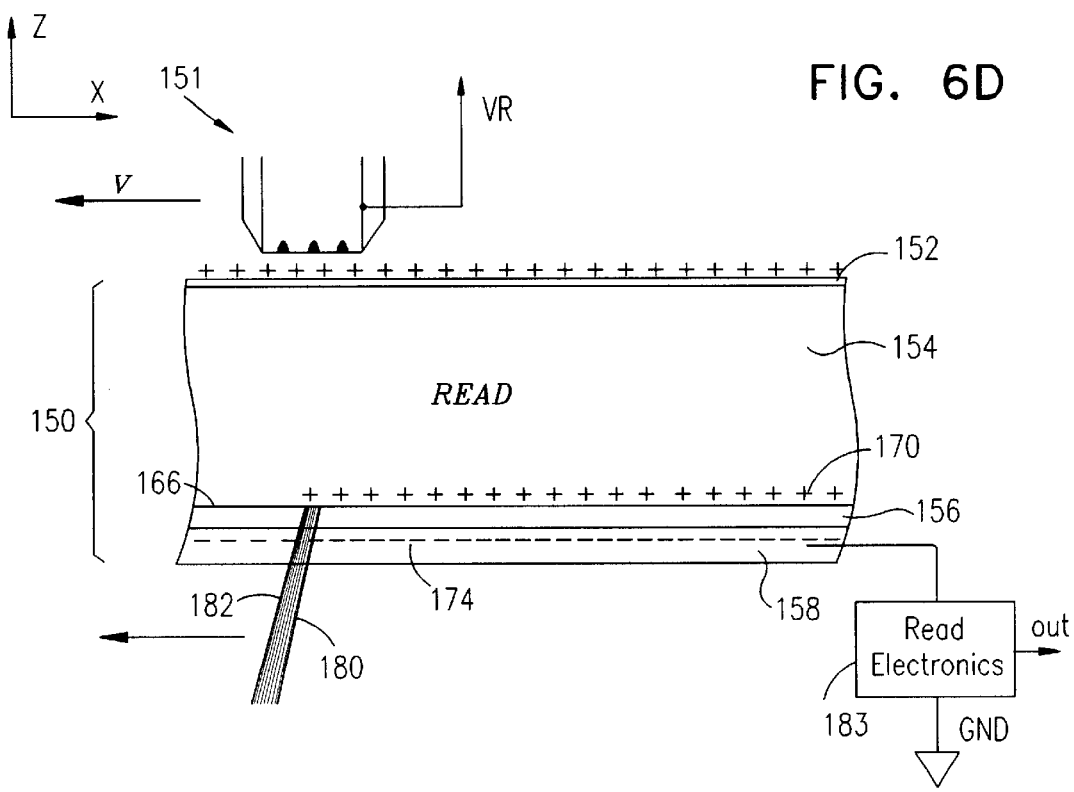
Figure 6E:
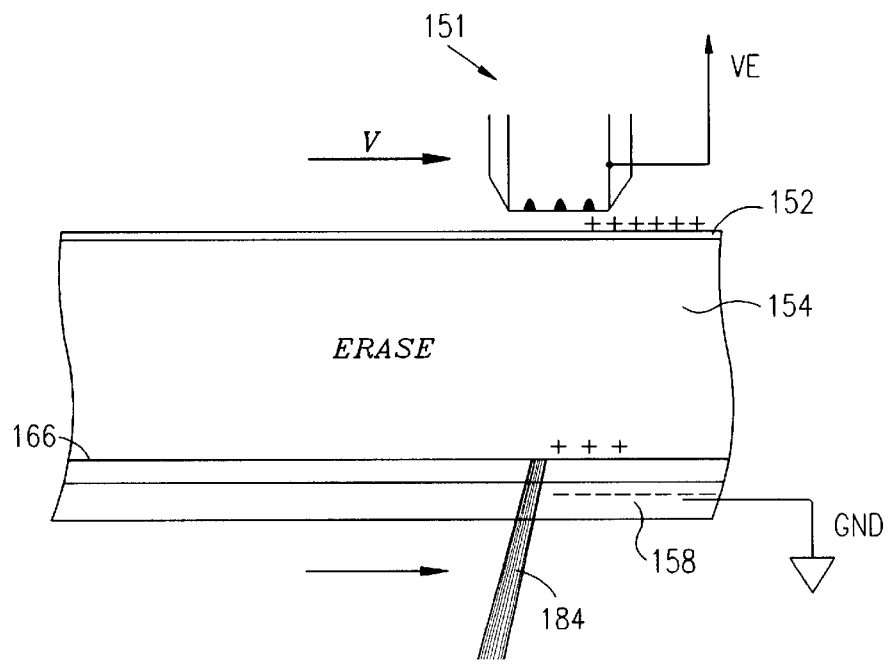
Figure 7A:
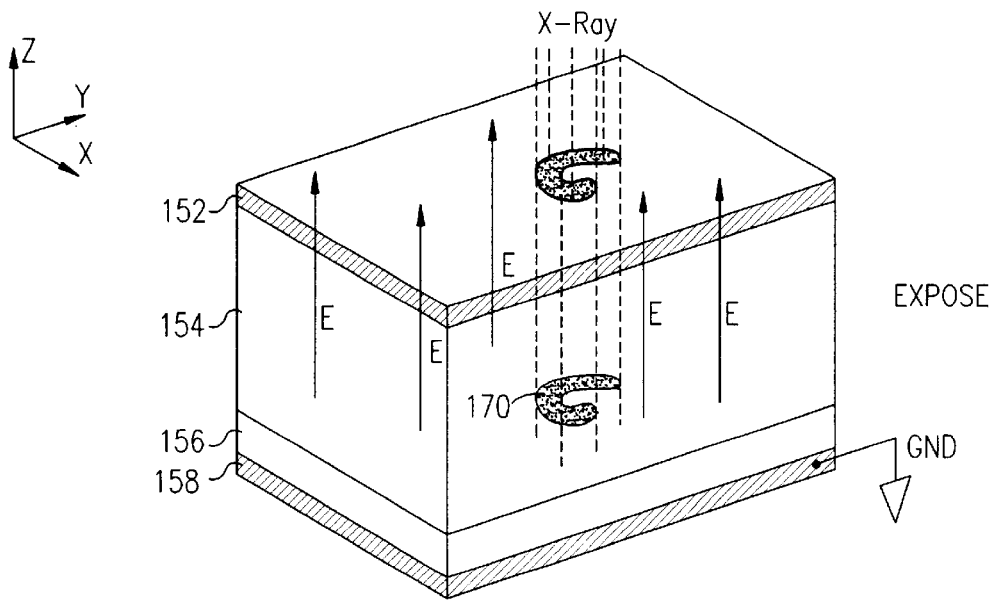
FIGS. 7A and 7B are simplified illustrations which serve to enable better understanding of the operation of the X-ray image detection module as illustrated in FIGS. 6A–6E.
Figure 7B:
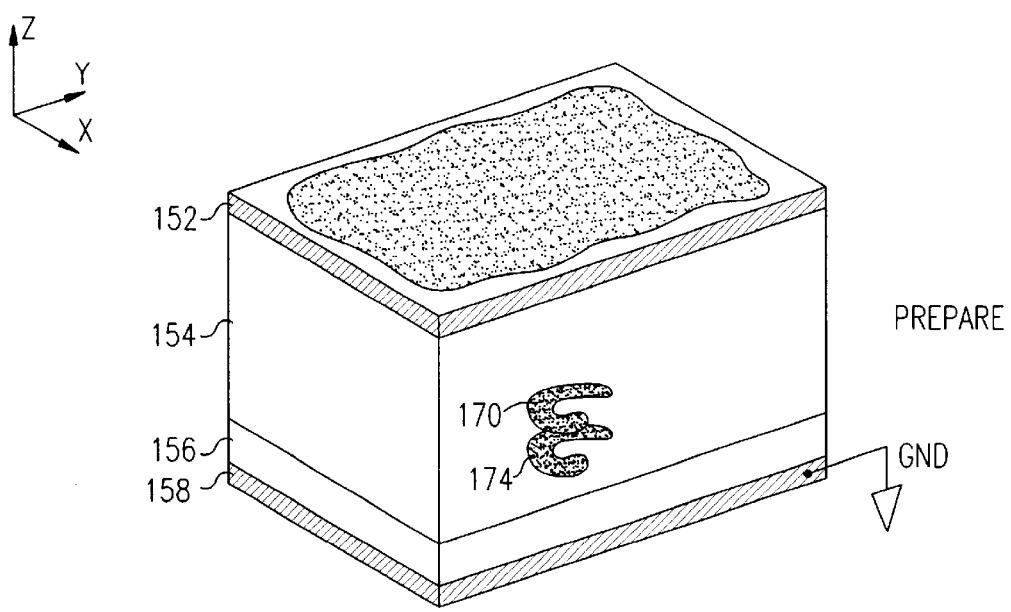
Figure 8:
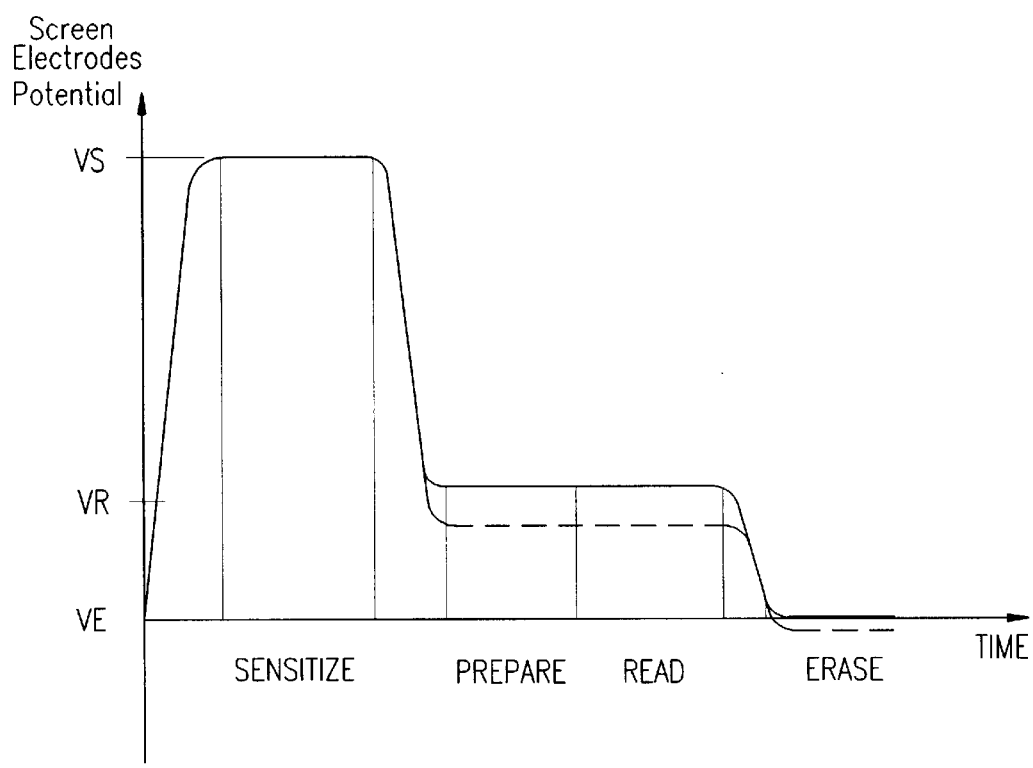
FIG. 8 is a voltage diagram useful in understanding of the operation of the X-ray image detection module as illustrated in FIGS. 6A–6E.

Reference is also made to FIGS. 7A and 7B, which are simplified illustrations which serve to enable better understanding of the operation of the X-ray image detection module as illustrated in FIGS. 6A–6E;

Reference is also made to FIG. 8, a voltage timing diagram which is useful in understanding the operation of the image detection module as illustrated in FIGS. 6A–6E.

For the sake of clarity, image detection module 146 is not shown in its entirety. Only detection assembly 150 and elongate charge injector 151 are shown.

Detection assembly 150 preferably comprises a top dielectric layer 152 having an outer charge accepting surface, an X-ray sensitive layer 154 underlying the top dielectric layer 152, a dielectric layer 156 underlying the X-ray sensitive layer 154, and a conductive electrode array 158 preferably having a plurality of elongate strip electrodes (not shown). Detection assembly 150 further includes an optically transparent support layer (not shown).

For the purpose of the discussion to follow, conductive electrode array 158 can be considered, electrostatically, as being a continuous electrode, since the gaps between strips thereof are typically beneath the overall operating resolution of detection assembly 150.

To sensitize the detection assembly 148, a bias potential VS is applied to the screen electrodes of elongate charge injector 151 as described hereinabove with particular reference to FIGS. 5A and 5B and a ground potential is applied to conductive electrode array 158.

Elongate charge injector 151 is then activated and swept over the outer charge accepting surface of top dielectric layer 152. During the sweep, charge is injected onto outer charge accepting surface of top dielectric layer 152 thus creating a uniform charge distribution and uniform apparent surface voltage (ASV) thereacross corresponding to VS and causing a uniform electric field to be created across X-ray sensitive layer 154 and dielectric layer 156.

Typically, the value and polarity of VS are selected in order to create a high, but sustainable, electric field across X-ray sensitive layer 154. For example, if X-ray sensitive layer 154 is amorphous selenium or a selenium-based alloy, VS has a positive polarity yielding positive charging such that the electric field strength generated as a result of the charging is preferably in the range of 5–20 volts/micron.

Creation of an electric field within X-ray sensitive layer 154 causes sensitization of the X-ray sensitive material in preparation for exposure to X-ray radiation, with a higher field strength typically providing increased sensitivity to X-ray radiation.

Preferably, sensitization is carried out immediately prior to X-ray exposure as described hereinbelow and ends with the elongate charge injector 151 overlying a non-active peripheral region (not shown) of detection assembly 150.

FIG. 6B illustrates the exposure of sensitized detection assembly 150 to X-ray imaging radiation 164. X-ray imaging radiation 164 is partially absorbed by X-ray sensitive layer 154, with the absorbed radiation representing a transmission modulated X-ray image of an object (e.g. a region of the human body).

Radiation photons which are by nature more energetic than the band gap of the X-ray sensitive material create free electron/hole pairs in X-ray sensitive layer 154 in accordance with an image-wise pattern. The electric field present across X-ray sensitive layer 154, causes the electron/hole pairs to separate, creating charge carriers of different polarities which move in opposing directions along electric field lines which are perpendicular to the plane of X-ray sensitive layer 154.

If the electric field is sufficiently strong, space charge effects are negligible and charge carrier transit is along straight field lines normal to the plane of X-ray sensitive layer 154, with virtually no sideways movement (lateral spread) of charge which could cause blurring or scattering and a corresponding reduction of image resolution. Thus, with a sufficiently strong electric field, generally high resolutions are typically maintained over X-ray sensitive layer 154, with minimal dependence on the layer thickness as described with reference to FIG. 7A

Since top dielectric layer 152 is positively charged, in the example shown, negative charge carriers move towards top dielectric layer 152 and positive charge carriers move to and are retained on an interface 166 between X-ray sensitive layer 154 and dielectric layer 156, thus creating a charge image 170 at interface 166 which replicates the transmission modulated image represented by X-ray imaging radiation 164.

Following X-ray exposure and the corresponding internal discharge of X-ray sensitive layer 154, the ASV at top dielectric layer 152 is no longer uniform. Moreover, the electric field in X-ray sensitive layer 154 is no longer uniform—instead the ASV and the electric field are reduced from their initial values in an image-wise manner in proportion to the amount of radiation absorbed by X-ray sensitive layer 154.

In order to minimize lateral charge carrier spread in X-ray sensitive layer 154 during charge carrier transit following X-ray exposure, the maximum reduction of any local electrical field (corresponding to maximum X-ray exposure) across X-ray sensitive layer 154 should preferably not exceed approximately one-third of the initial field strength.

Thus, in order to maintain high resolution, the maximum dose of X-ray imaging radiation 164 preferably does not exceed the dose necessary to reduce the initial local electrical field across X-ray sensitive layer 154 by one-third.

Subsequent to X-ray exposure, detection assembly 150 is prepared for a read cycle as illustrated in FIG. 6C.

After exposure and prior to reading, the detection assembly 150 is prepared for reading by reducing the bias voltage applied to screen electrode(s) of elongate charge injector 151 to a value VR which is preferably less than one-third of VS as shown in FIG. 8. The elongate charge injector 151 is activated by applying an AC voltage to the embedded electrodes as described hereinabove and sweeps over the detection assembly 150. During the sweep the charge distribution and corresponding ASV on top dielectric layer 152, which was patternized following the exposure of X-ray sensitive layer 154, is re-uniformized to a level corresponding to bias voltage VR, which is preferably lower than VS.

The purpose of reducing the ASV from the value VS to the value VR is to factor out a significant DC component of the electrical field across X-ray sensitive layer 154, bringing the electrical field to the minimum level which still retains charge image 170 with no dissipation. Typically, this brings the electrical field at interface 166, for locations which received maximum exposure, to a minimal, nearly zero field level. Corresponding underlying locations within dielectric layer 156 experience a maximum field value while locations within dielectric layer 156 at which no exposure occurred experience a minimum field value.

In addition, by re-uniformizing the ASV to the value VR charge injection is provided onto top dielectric layer 152, causing a corresponding redistribution of charge within conductive electrode array 158 resulting in a charge distribution replica 174, which mirrors charge pattern 170 with counter charges, to be retained in the conductive electrode array 158 while the rest of the charges are swept out to ground. It is appreciated that the structure of detection assembly 150 and the relationship between the various layers and the properties thereof allows the induced mirror charge to be generated in conductive electrode array 158.

FIG. 6D illustrates the reading of charge image 170 by sequential line-by-line uniformization of raster lines of the charge image 170 using an elongate light beam 180. Elongate light beam 180 is generated by an elongate light source (not shown) which may be of the type described hereinabove.

Reading occurs as follows:

Elongate light beam 180, having a sharply defined leading edge 182, impinges upon interface 166 through the transparent underside of detection assembly 150, exposing an area of charge image 170. The elongate light source (not shown) preferably comprises an array of LEDs as described hereinabove with reference to FIGS. 3A–4, with the reading LEDs active during the read mode.

Elongate charge injector 151 is activated when a bias voltage of VR is applied to the screen electrodes to provide charge injection to an area of top dielectric layer 152 which overlies the region being exposed to impinging light from below.

Impinging light from the elongate light source (not shown) causes generation of electron/hole pairs in the impinged areas of X-ray sensitive layer 154, which are separated/extracted if an electric field is present thereacross, resulting in photodischarge within X-ray sensitive layer 154.

During photodischarge, new charge is injected onto top dielectric layer 152 to compensate for ASV deviations causing a corresponding charge redistribution in the conductive electrode array 158. It is appreciated that charge injection is self-quenching and continues until the ASV on top dielectric layer 152 reaches the screen electrode potential value VR.

It is appreciated that elongate light beam 180 causes deviations in the ASV by photodischarge which extend over an elongate area that is significantly wider, in the x-direction, than the actual area projected by elongate light beam 180. Thus, the number of charge generation regions of elongate charge generator 151 and the spacing therebetween, are selected such that the active charge injection area in the x-direction is significantly wider than the projected area exposed to elongate light beam 180.

Charge injection and photodischarge continue until internal electric fields over X-ray sensitive layer 154 at interface 166 have been effectively neutralized at areas exposed to impinging light, resulting in a uniform charge distribution at interface 166 at light exposed areas.

The minimum intensity across elongate light beam 180 must be sufficient to fully discharge exposed areas of charge image 170 during reading. Temporal and spatial fluctuations in light beam intensity, above the minimum, are not detrimental to the reading operation.

Typically, for reading, the profile of sharply defined leading edge 182 of elongate light beam 180 is the dominant factor in determining the resolution of the image being read in the sweep direction. The trailing edge profile of elongate light beam 180 is not significant.

Beyond leading edge 182, light intensity is nearly zero and thus does not affect charge pattern 170. Moreover, reflections that occur as elongate light beam 180 impinges upon the underside layers of detection assembly 150 are directed away from leading edge 182 of elongate light beam 180 and do not affect charge image 170 beyond leading edge 182. Furthermore, since elongate light beam 180 is constituted of non-coherent light, light interference is inconsequential.

Read electronics 183, which are as described hereinbelow, are synchronized with the sweep of elongate light source (not shown) and elongate charge injector 151 along detection assembly 150.

The elongate light source (not shown) projecting elongate light beam 180 is preferably activated in pulses in accordance with the read sampling frequency as described hereinbelow in connection with FIGS. 9–11. Alternatively, elongate light beam 180 may be continuously projected during reading, independently of the read sampling frequency. In accordance with either embodiment, the read "steps" as defined by the read sampling frequency determine the width of each raster line of charge image 170 to be read.

With each read "step" of elongate light beam 180, a new raster line of charge image 170 along sharply defined edge 182 is exposed to light and undergoes uniformization. As a result of the concurrent injection of external charge from elongate charge injector 151, currents flow in conductive electrode array 158 to cause corresponding uniformization of charge pattern replica 174. The currents flowing are measured by read electronics 183 as described hereinbelow, thus a raster line of charge pattern replica 174 is read and an electrical signal representation of a raster line of charge image 170 is provided.

The electrical signal representation of charge image 170 also includes a DC component which is a function of the charge density level to which charge image 170 is uniformized. Preferably, by selecting the value for VR as described above, the DC component of the signal representation is minimized thus allowing a broader dynamic range for signal readout.

It is appreciated that although the width of elongate light beam 180 in the x-direction is greater than one raster line and may comprise many raster lines, regions at which charge image 170 has been made uniform generally do not undergo further charge redistribution as a result of repeated exposure to optical radiation. Thus, the highest achievable resolution in the sweep direction is determined only by the sharpness of the leading edge and not by the width of the elongate light beam 180.

Measurable currents in conductive electrode array 158 are read from all active electrodes in the array in parallel, thus providing parallel line-by-line reading of raster lines of charge pattern 170. Since entire raster lines are read in parallel, very high speed reading can be accomplished.

Reading resolution, and thus pixel size, are adjustable in the x-direction by selecting the read "step" size, with the minimum pixel being determined by the definition/sharpness of leading edge 182 of elongate light beam 180.

In the transverse direction (y-direction), reading resolution, and thus pixel size, are adjustable electronically, with the minimum pixel size determined by the pitch of conductive strips in conductive electrode array 158 as described herein.

The purpose of the erasing step as described by FIG. 6E, is to condition X-ray sensitive layer 154 for subsequent exposure and reading steps by neutralizing space charges within X-ray sensitive layer 154, including charges retained at interface 166 and charges retained at releasable trap sites distributed throughout X-ray sensitive layer 154.

In accordance with a preferred embodiment of the present invention, charge neutralization is carried out as follows:

Residual charges within detection assembly 150 are erased by injecting external charges, of the appropriate polarity, onto top dielectric layer 152 for charge neutralization and simultaneously impinging with elongate light beam 184 through the bottom of detection assembly 150 for photodischarge during a sweep thereacross.

During erasing, the elongate charge injector 151 is activated with a bias voltage VE applied to the screen electrodes, and selected to be near 0 volts or having a slightly negative value.

Elongate light beam 184 may comprise light emitted from erasing LEDs which generally penetrates into X-ray sensitive layer 154 as described hereinabove. Alternatively, elongate light beam 184 may comprise light emitted either from both reading LEDs and erasing LEDs or solely from reading LEDs as described hereinabove. Charge injection and photodischarge continue until the internal electric field, which "drives" the photodischarge, and the external field, which drives the injection of charge, are reduced to a minimum value thus indicating neutralization of charge retained therein.

It is appreciated that the structure of detection assembly 150 allows efficient erasing and neutralizing of residual space charge within X-ray sensitive layer 154 following imaging and reading. This principle of erasing is based on a combination of light induced photoconductivity in the material and injection of external charges of appropriate polarity allowing efficient charge flow and neutralization of space charge in trap sites and at interface 166.

Reference is now made to FIGS. 9–11 which illustrate read electronics 200 which may be used in accordance with an X-ray image detection assembly as described hereinabove. FIGS. 9 and 10 are schematic electrical circuit diagrams of read electronics 200 connected to conductive electrodes 201 of a detection assembly as described hereinabove.

Also shown is elongate light source 208 which generally transverses conductive electrodes 201 and which may be of the type described hereinabove.

It is appreciated that conductive electrodes 201 may serve as the strip electrodes 72 of conductive electrode array 62 (FIGS. 2A–2B) or as the conductive electrodes of conductive electrode array 158 (FIGS. 6A–6E).

FIG. 11 is a timing diagram of the signals associated with read electronics 200. These signals may be supplied by a system controller (not shown).

It is appreciated that the circuits described herein represent one embodiment of read electronics 200. Alternative circuit embodiments capable of high speed, parallel reading of small signals with minimal noise may be used as an alternative to the circuits described in connection with FIGS. 9 and 10.

Typically, a charge pattern to be read comprises an m–n pixel matrix, where m is a fixed number corresponding to the number of conductive electrodes 201 and n is determined by the read sampling frequency. For example, it is a particular feature of the present invention that reading of an 17"×17" X-ray image comprising as many as 20,000,000 pixels can be accomplished in seconds and preferably in less than one second.

Charge patterns are read by measuring the current which flows during a read cycle between conductive electrodes 201 and ground 210. The measured current is translated to electrical signals thus providing "reading" of a charge image associated with conductive electrodes 201 and creating an electrical signal representation thereof It is appreciated that the charge image associated with conductive electrodes 201 is the mirror charge replica representing the x-ray image as described hereinabove.

Readout electronics 200 include a plurality of multi-channel analog circuits 212 and a plurality of multi-channel digital circuits 214. Typically the number of channels of multi-channel circuits 212 and 214 is equal to the number of conductive electrodes 201, with each electrode connected to a single channel.

Typically, each input channel of multi-channel analog circuit 212 includes a reader 216. Reader 216 measures input current and provides a pulse-width modulated (PWM) output signal, corresponding to the current integrated over a predefined period of time T (i.e. total charge flowing) associated with the read sampling frequency. Reader 216 is described hereinbelow with reference to FIG. 10.

The PWM signal output by reader 216 is input to a corresponding converter 218 of multi-channel digital circuit 214. Converter 218 is described hereinbelow with reference to FIG. 10.

Converter 218 converts the PWM signal to multi-bit digital data which is output to a data bus 220 in synchronization provided by a multiplexer 222.

Thus, readout electronics 200 provides a parallel conversion from small-signal analog information to multi-bit serial digital data.

According to a preferred embodiment of the present invention illustrated in FIG. 9, each multi-channel analog circuit 212 is realized in an individual Application Specific Integrated Circuit (ASIC) and each multi-channel digital circuit 214 is realized in an individual digital ASIC.

In accordance with an alternative embodiment of the invention, the analog and digital ASICS may be integrated into a single ASIC. However, in order to enhance the signal to noise ratio of readout electronics 200, it is preferable to provide distinct analog ASICs and digital ASICs. Preferably, and in order to effectively achieve the parallel to serial data conversion, the digital ASICs are cascadable.

Multi-channel analog circuit 212 and multi-channel digital circuit 214 can be better understood by referring to FIG. 10 which schematically illustrates the operation of reader 216 and converter 218 for a single channel.

A transimpedance amplifier 224 serves as an impedance buffer for conductive electrodes 201. Current entering reader 216 flows through transimpedance amplifier 224 to ground 210 which converts the signal current to a corresponding amplified voltage signal.

The amplified voltage signal is filtered by a filter 226 which limits the bandwidth of signal detection thus rejecting a high level of noise while preserving the signal information, thereby improving the signal to noise ratio.

The filtered signals are integrated over time by an integrator 228 to provide a value which corresponds to the total current flowing through a channel during time T, associated with the read sampling frequency. Time T is established by consecutive reset signals R input to integrator 228.

Integrating the filtered signals at integrator 228 allows accumulation of momentary signal values, thus enhancing the signal, while random noise interference is averaged out. This further improves the signal to noise ratio.

Upon activation by means of a sample actuation signal S, the value output by integrator 228 is sampled by a sample and hold circuit 232. The resulting sampled value is then applied to a comparator 234 for comparison to a ramp signal. As a result of the comparison, comparator 234 outputs a pulse width modulated signal PWM corresponding to the level of the sampled value.

Converter 218 receives the PWM signal and converts it into digital data with a predefined depth (e.g. 8–14-bit). The digital data value is output to data bus 220. Typically, each converter 218 includes a counter 236 and a data latch 238.

During each read time cycle $T_n$, m pixels are read in parallel (one pixel per conductive electrode 201) corresponding to one raster line of the charge pattern to be read.

Read cycle $T_n$, which is shown in FIG. 11, typically has a duration which is greater than 100 microseconds, is as follows:

Signal LA is given to elongate light source 208, collectively activating the LED's of reading array 101 (FIGS. 3A and 3B) for a duration which generates a suitable electron/hole pairs to eventually cause regional discharge and neutralization of X-ray sensitive layer 154 (FIGS. 6A–6E). It is appreciated that discharge and neutralization are not completed during signal LA. Instead, during the remainder of cycle $T_n$, prior to sample and hold activation, transit of generated mobile holes through X-ray sensitive layer 154 to complete neutralization and discharge is carried out. A typical transit time for mobile holes in a 500 micron layer of amorphous selenium is several tens of microseconds.

At the beginning of the cycle, signal E enables comparator 234 and counter 236 and the ramp signal starts ramping up towards its maximum value.

Comparator 234 outputs a "high" PWM signal and counter 236 counts up the clocks of signal CC. When the ramp signal becomes equal to the sampled signal value, the PWM signal drops to a "low" state and counter 236 ceases counting.

When the PWM signal is "low", counter 236 maintains a count value (8–14-bit) corresponding to the duration of the "high" PWM signal.

Towards the end of cycle $T_n$, Sample actuation signal S causes sample and hold circuit 232 to sample the value of Pixel n and causes data latch 238 to sample and store the count value of counter 236 for Pixel n−1.

Enable signal E is then disabled and ramp signal drops to its minimum value in preparation for a subsequent comparison.

Following activation by sample actuation signal S, reset signal R is given to counter 236 and integrator 228, resetting them in preparation for subsequent analog signal sampling and digital conversion.

Typically, plurality of multi-channel digital circuits 214 are cascaded together. Each multi-channel digital circuit 214 is selected by a chip select input signal CSI to sequentially transfer data loaded in data latches 238 to data bus 220 using clocks provided by shift clock signal SC (FIG. 9).

When the last data latch 238 has transferred its data to data bus 220, a chip select output si CSO is provided by multi-channel digital circuit 214. The CSO serves as the CSI signal for a subsequent multi-channel digital circuit 214 in the cascade.

The chip selection process continues until each multi-channel digital circuit 214 in the cascade has sequentially output the data stored in its data latches 238 to data bus 220.

Each complete CSI/CSO cycle over the cascade, provides multi-bit digital data on data bus 220 sequentially from m channels representing one raster line of an image to be read.

The CSI signal to the first multi-channel digital circuit 214 in the cascade occurs immediately after sample actuation signal S has enabled the transfer of data from each counter 236 to each data latch 238.

Thus, during each cycle $T_n$ the following occurs at each of the m channels:

Data for pixel n is integrated and sampled.

Sampled analog data for pixel n−1 is converted to digital data and stored.

Stored digital data for pixel n−2 is sequentially transferred to data bus 220 from each of the m channels.

It will be appreciated by persons skilled in the art that the present invention is not limited by what has been described above. The scope of the present invention includes both combinations and sub-combinations of the various features described hereinabove as well as modifications and additions thereto which would occur to a person skilled in the art upon reading the foregoing disclosure and which are not in the prior art.

What is claimed is:

1. A radiation image detector comprising:
   an ionizing radiation sensing element which is operative to present an imagewise electrostatic charge distribution in response to imagewise ionizing radiation thereof;
   a charge injector, in non-contact proximity with said ionizing radiation sensing element, which is operative to inject charge onto said radiation sensing element;
   an optical radiation source which projects visible radiation onto said radiation sensing element; and
   read circuitry, which detects information-bearing signals, representing said imagewise electrostatic charge distribution, said signals being created when the charge injector and the optical radiation source are concurrently activated in generally mutual registration.

2. A radiation image detector according to claim 1 wherein the imagewise ionizing radiation is imagewise X-ray radiation.

3. A radiation image detector according to claim 1 wherein the ionizing radiation sensing element comprises a layered stack having the following order:
  an optically transparent support substrate;
  an optically transparent conductive layer;
  an optically transparent dielectric layer; and
  a photoconductor.

4. A radiation image detector according to claim 1 wherein the ionizing radiation sensing element comprises a layered stack having the following order:
  an optically transparent support substrate;
  an optically transparent conductive layer;
  a first dielectric layer;
  a photoconductor; and
  a second dielectric layer.

5. A radiation image detector according to claim 4 wherein said second dielectric layer serves as an optical filter tailoring a radiation spectrum of optical radiation penetrating into the photoconductor.

6. A radiation image detector according to claim 3 wherein the photoconductor is at least one of amorphous selenium and a selenium alloy.

7. A radiation image detector according to claim 3 wherein the photoconductor is a material selected from the group consisting of lead oxide, thallium bromide, cadmium telluride, cadmium zinc telluride, cadmium sulfide, and mercury iodide.

8. A radiation image detector according to claim 4 wherein the photoconductor is at least one of amorphous selenium and a selenium alloy.

9. A radiation image detector according to claim 4 wherein the photoconductor is a material selected from the group consisting of lead oxide, thallium bromide, cadmium telluride, cadmium zinc telluride, cadmium sulfide, and mercury iodide.

10. A radiation image detector according to claim 1, wherein said charge injector scans the ionizing radiation sensing element.

11. A radiation image detector according to claim 10, wherein the charge injector comprises:
  at least one embedded electrode;
  at least one exposed screen electrode;
  said at least one embedded electrode and said at least one exposed screen electrode being separated at a region of proximity by a dielectric medium;
  an electrical driver which provides an AC voltage between the at least one embedded electrode and the at least one screen electrode causing air discharge at said region of proximity, thus generating positive and negative charges; and
  a voltage source which provides a DC bias voltage in the range of zero to several thousand volts to the at least one screen electrode, providing the driving force for charge injection.

12. A radiation image detector according to claim 11 wherein the DC bias voltage can be selected such that the DC component associated with the Fourier spectrum of spatial frequencies of an image to be detected is reduced.

13. A radiation image detector according to claim 1 and wherein said optical radiation source scans the radiation sensing element.

14. A radiation image detector according to claim 13, wherein the optical radiation source includes at least one first source of visible radiation which is mainly absorbed at the surface of a photoconductor of the ionizing radiation sensing element.

15. A radiation image detector according to claim 14 and wherein said optical radiation source also includes at least one second source of optical radiation which generally penetrates deeply into the photoconductor of the radiation sensing element.

16. A radiation image detector according to claim 13 and wherein the optical radiation source includes a generally linear array of light emitting diodes.

17. A radiation image detector according to claim 16 and wherein the optical radiation source also includes elongate converging optics, and an optical beam shaping enclosure having an elongate opening through which a generally elongate beam of optical radiation may be projected.

18. A radiation image detector according to claim 17 and wherein the generally elongate beam of optical radiation has at least one well-defined elongate edge.

19. A radiation image detector according to claim 1 wherein said read circuitry is permanently coupled to the radiation sensing element.

20. A radiation image detector according to claim 1 wherein said read circuitry is removably coupled to the radiation sensing element.

21. A module for detection of ionizing radiation images, the module comprising:
  an ionizing radiation responsive layered substrate arranged to respond to an ionizing radiation image, said ionizing radiation responsive layered substrate including at least one layer which is segmented into a plurality of parallel strips, and at least one non-segmented layer;
  an elongate charge injector operative in associating with said ionizing radiation responsive layered substrate to inject charge thereto, transversing at least part of said plurality of parallel strips, and scanning said ionizing radiation responsive layered substrate along a scanning axis which is generally parallel to said strips; and
  a source of visible radiation operative in association with said ionizing radiation responsive layered substrate, projecting an elongated beam of visible radiation which transverses at least part of said plurality of parallel strips, wherein said beam scans the substrate along said scanning axis.

22. A method for detecting radiation images, comprising:
  providing an X-ray sensitive layered substrate which convents radiation photons to charge carriers, a scanning charge injector which injects charge onto said layered substrate; a scanning source of optical radiation which projects an elongate light beam unto said layered substrate; and read circuitry;
  creating a first generally uniform charge distribution over the X-ray sensitive layered substrate using the scanning charge injector;
  exposing the X-ray sensitive layered substrate to imagewise X-ray radiation thereby patterning the uniform charge distribution in correspondence with the imagewise X-ray radiation;

creating a second generally uniform charge distribution over the X-ray sensitive layered substrate using the spanning charge injector; and detecting the patterned uniform charge distribution using read circuitry by simultaneously and in generally mutual registration activating the scanning source of optical radiation and the scanning charge injector.

23. A method for detecting radiation images according to claim 22, further including reducing the DC component associated with a Fourier spectrum of spatial frequencies of an image to be detected, such that the second uniform charge distribution has a lower charge density than said first uniform charge distribution.

24. A method for detecting radiation images according to claim 22, further including neutralizing space charge trapped in X-ray sensitive layered substrate by concurrently and in generally mutual registration activating the scanning source of optical radiation and the scanning charge injector.

* * * * *